(12) United States Patent
Liu et al.

(10) Patent No.: US 11,402,529 B2
(45) Date of Patent: Aug. 2, 2022

(54) IDENTIFYING GEOLOGIC FEATURES IN A SUBTERRANEAN FORMATION USING SEISMIC DIFFRACTION AND REFRACTION IMAGING

(71) Applicant: Saudi Arabian Oil Company, Dhahran (SA)

(72) Inventors: Hongwei Liu, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 164 days.

(21) Appl. No.: 16/738,539

(22) Filed: Jan. 9, 2020

(65) Prior Publication Data
US 2021/0215842 A1 Jul. 15, 2021

(51) Int. Cl.
*G01V 1/30* (2006.01)
*G01V 1/34* (2006.01)

(52) U.S. Cl.
CPC .............. *G01V 1/302* (2013.01); *G01V 1/345* (2013.01); *G01V 2210/48* (2013.01); *G01V 2210/643* (2013.01)

(58) Field of Classification Search
CPC ........ G01V 1/302; G01V 1/345; G01V 1/301; G01V 1/28; G01V 2210/48; G01V 2210/643

(Continued)

(56) References Cited

U.S. PATENT DOCUMENTS

| 493,339 A | 3/1893 | Phillips |
| 1,028,012 A | 5/1912 | Foster |

(Continued)

FOREIGN PATENT DOCUMENTS

| CN | 105093301 | 11/2015 |
| CN | 106154319 | 11/2016 |

(Continued)

OTHER PUBLICATIONS

Definition of wavefield, Your Dictionary, printed on Aug. 15, 2021. (Year: 2021).*

(Continued)

*Primary Examiner* — Michael P Nghiem
(74) *Attorney, Agent, or Firm* — Fish & Richardson P.C.

(57) ABSTRACT

A process for seismic imaging of a subterranean geological formation includes generating a source wavefield from seismic data representing a subterranean formation. The process includes generating a receiver wavefield from the seismic data representing the subterranean formation. The process includes decomposing the source wavefield to extract a source depth component and decomposing the receiver wavefield to extract a receiver depth component. The process includes applying a transform to each of the source depth component and the receiver depth component. The process includes combining the source depth component and the receiver depth component to generate an imaging condition. The process includes extracting a low-frequency term from the imaging condition to generate a wave-path tracking data, generating a wave path from the wave-path tracking data, and rendering a seismic image of at least a portion of the subterranean geological formation from the generated wave path.

17 Claims, 18 Drawing Sheets

(58) Field of Classification Search
USPC .......................................................... 702/16
See application file for complete search history.

(56) References Cited

U.S. PATENT DOCUMENTS

| | | | |
|---|---|---|---|
| 3,441,631 A | 4/1969 | Fernald et al. | |
| 3,502,741 A | 3/1970 | Fernald et al. | |
| 3,688,249 A | 8/1972 | Backus et al. | |
| 3,691,529 A | 9/1972 | Pizante | |
| 4,449,208 A | 5/1984 | Moeckel et al. | |
| 4,562,540 A | 12/1985 | Devaney | |
| 4,935,904 A | 6/1990 | Chambers et al. | |
| 5,292,837 A | 3/1994 | Heinrich et al. | |
| 6,767,975 B1 | 7/2004 | Liu | |
| 7,085,195 B2 | 8/2006 | Taner et al. | |
| 7,157,532 B2 | 1/2007 | Payer et al. | |
| 7,196,969 B1 | 3/2007 | Karazincir | |
| 7,373,252 B2 | 5/2008 | Sherrill et al. | |
| 7,643,377 B1 | 1/2010 | Uzes | |
| 7,970,546 B1 | 6/2011 | Peng | |
| 8,116,168 B1 | 2/2012 | Luo et al. | |
| 8,209,125 B2 | 6/2012 | Berkovitch et al. | |
| 8,227,653 B2 | 7/2012 | Weber et al. | |
| 8,248,886 B2 | 8/2012 | Neelannani et al. | |
| 8,675,447 B2 | 3/2014 | Poole et al. | |
| 8,803,878 B2 | 8/2014 | Andersen et al. | |
| 8,948,463 B2 | 2/2015 | Landa et al. | |
| 9,116,255 B2 | 8/2015 | Eick et al. | |
| 9,128,205 B2 | 9/2015 | Guan et al. | |
| 9,536,143 B2 | 1/2017 | Jiang et al. | |
| 9,568,627 B2 | 2/2017 | Guigne et al. | |
| 9,575,194 B2 | 2/2017 | Khalil et al. | |
| 9,632,192 B2 | 4/2017 | Baina et al. | |
| 9,633,472 B2 | 4/2017 | Thomas et al. | |
| 9,651,694 B2 | 5/2017 | Zhang et al. | |
| 9,696,445 B2 | 7/2017 | Kluver et al. | |
| 9,702,997 B2 | 7/2017 | Sava et al. | |
| 9,715,027 B2 | 7/2017 | Gersztenkorn et al. | |
| 9,724,681 B2 | 8/2017 | Lucciulli et al. | |
| 9,726,771 B1 | 8/2017 | Popovici et al. | |
| 9,733,371 B2 | 8/2017 | Burnett et al. | |
| 9,766,357 B2 | 9/2017 | Cha | |
| 9,880,303 B2 | 1/2018 | Landa et al. | |
| 9,896,392 B2 | 2/2018 | Meiswinkel et al. | |
| 9,919,298 B2 | 3/2018 | Schmidt et al. | |
| 10,022,698 B2 | 7/2018 | Shaikh et al. | |
| 10,232,339 B2 | 3/2019 | Bischof et al. | |
| 10,280,125 B2 | 5/2019 | Sogo et al. | |
| 10,281,604 B2 | 5/2019 | Jing et al. | |
| 10,295,685 B2 | 5/2019 | Zhang et al. | |
| 10,310,113 B2 | 6/2019 | Sun et al. | |
| 10,310,122 B2 | 6/2019 | Haacke et al. | |
| 10,324,204 B1 | 6/2019 | Sturzu et al. | |
| 10,557,954 B2 | 2/2020 | Tonellot et al. | |
| 10,641,916 B2 | 5/2020 | Ozbek et al. | |
| 10,889,533 B2 | 1/2021 | Melibari et al. | |
| 10,928,533 B2 | 2/2021 | Ji et al. | |
| 10,935,680 B2 | 3/2021 | Tsingas et al. | |
| 11,029,431 B2 | 6/2021 | Zhang et al. | |
| 11,041,970 B2 | 6/2021 | Zhang et al. | |
| 2004/0152850 A1 | 8/2004 | Payer et al. | |
| 2005/0219949 A1 | 10/2005 | Taner et al. | |
| 2007/0203673 A1 | 8/2007 | Sherrill et al. | |
| 2008/0285383 A1* | 11/2008 | An | G01V 1/28 367/38 |
| 2010/0097888 A1 | 4/2010 | Neelamani et al. | |
| 2010/0114494 A1* | 5/2010 | Higginbotham | G01V 1/303 702/16 |
| 2010/0131205 A1 | 5/2010 | Berkovitch et al. | |
| 2010/0171740 A1 | 7/2010 | Andersen | |
| 2012/0016097 A1 | 1/2012 | Weber et al. | |
| 2012/0051176 A1 | 3/2012 | Liu | |
| 2012/0163121 A1 | 6/2012 | Hardage | |
| 2012/0300584 A1 | 11/2012 | Eick et al. | |
| 2012/0307591 A1* | 12/2012 | Hegna | G01V 1/30 367/21 |
| 2013/0060476 A1 | 3/2013 | Thomson | |
| 2013/0077832 A1 | 3/2013 | Landa et al. | |
| 2013/0176819 A1 | 7/2013 | Poole | |
| 2014/0032119 A1 | 1/2014 | Landa et al. | |
| 2014/0133275 A1 | 3/2014 | Guan et al. | |
| 2014/0149046 A1 | 5/2014 | Baina et al. | |
| 2014/0269183 A1 | 9/2014 | Kluver et al. | |
| 2014/0293744 A1 | 10/2014 | Zhang | |
| 2014/0321713 A1 | 10/2014 | Sava et al. | |
| 2014/0328140 A1 | 11/2014 | Khalil et al. | |
| 2015/0063066 A1 | 3/2015 | Burnett et al. | |
| 2015/0103623 A1 | 4/2015 | Gersztenkorn | |
| 2015/0112601 A1 | 4/2015 | Ozbek | |
| 2015/0124559 A1 | 5/2015 | Cha et al. | |
| 2015/0170411 A1 | 6/2015 | Thomas | |
| 2015/0203418 A1 | 7/2015 | Meiswinkel et al. | |
| 2015/0235081 A1 | 8/2015 | Jiang et al. | |
| 2015/0331123 A1 | 11/2015 | Guigne et al. | |
| 2016/0091624 A1 | 3/2016 | Haacke et al. | |
| 2016/0325274 A1 | 11/2016 | Schmidt | |
| 2016/0334526 A1 | 11/2016 | Pica | |
| 2016/0341837 A1 | 11/2016 | Jing et al. | |
| 2016/0367977 A1 | 12/2016 | Shaikh et al. | |
| 2017/0001182 A1 | 1/2017 | Schmidt et al. | |
| 2017/0007994 A1 | 1/2017 | Lucciulli et al. | |
| 2017/0097428 A1 | 4/2017 | Sun | |
| 2017/0151547 A1 | 6/2017 | Shaik et al. | |
| 2017/0197892 A1 | 7/2017 | Khawaji | |
| 2018/0164452 A1 | 6/2018 | Oukili et al. | |
| 2018/0239041 A1 | 8/2018 | Tsingas et al. | |
| 2018/0292554 A1 | 10/2018 | Zhang et al. | |
| 2018/0327332 A1 | 11/2018 | Sogo et al. | |
| 2018/0345243 A1 | 12/2018 | Bischof et al. | |
| 2018/0356547 A1 | 12/2018 | Tonellot et al. | |
| 2019/0092707 A1 | 3/2019 | Melibari et al. | |
| 2019/0179044 A1 | 6/2019 | Zhang et al. | |
| 2019/0179045 A1 | 6/2019 | Zhang et al. | |
| 2019/0353812 A1 | 11/2019 | Zhang et al. | |
| 2020/0341160 A1 | 10/2020 | Ji et al. | |
| 2020/0408943 A1* | 12/2020 | Qin | G01V 1/36 |
| 2021/0063570 A1 | 3/2021 | Liu et al. | |
| 2021/0181364 A1* | 6/2021 | Zhang | G01V 1/345 |
| 2021/0278558 A1 | 9/2021 | Zhang et al. | |

FOREIGN PATENT DOCUMENTS

| | | |
|---|---|---|
| CN | 109307890 | 2/2019 |
| EP | 0109341 | 2/1991 |
| EP | 3029491 | 6/2016 |
| GB | 2483997 | 3/2012 |
| WO | WO 2011154762 | 12/2011 |
| WO | WO 2013163131 | 10/2013 |
| WO | WO 2016156530 | 10/2016 |

OTHER PUBLICATIONS

Batany et al., "Adaptive multiple subtraction: Unification and Comparison of matching filters based on the lq-norm and statistical independence," Geophysics vol. 81, No. 1, Jan.-Feb. 2016, 13 pages.
Berkhout and Verschuur, "Estimation of multiple scattering by iterative inversion, Part I: Theoretical considerations," Geophysics vol. 62, No. 5, Sep.-Oct. 1997, 10 pages.
Chen and Fomel, "Random noise attenuation using local signal-and-noise orthogonalization," Geophysics vol. 80, No. 6, WD1-WD9, 2015, 19 pages.
Donno , "Improving multiple removal using least-squares dip filters and independent component analysis," Geophysics vol. 76, No. 5, Sep.-Oct. 2011, 14 pages.
Donno et al., "Curvelet-based multiple prediction," Geophysics vol. 75, No. 6, Nov.-Dec. 2010, 9 pages.
Fomel, "Shaping regularization in geophysical-estimation problems," Geophysics vol. 72, No. 2, Mar.-Apr. 2007, 8 pages.
Guitton and Verschuur, "Adaptive subtraction of multiples using the L1-norm," Geophysical Prospecting, vol. 52, Issue 1, Jan. 2004, 12 pages.

(56) References Cited

OTHER PUBLICATIONS

Guitton, "Multiple attenuation in complex geology with a pattern-based approach," Geophysics vol. 70, No. 4, Jul.-Aug. 2005, 11 pages.
Herrmann et al., "Non-linear primary-multiple separation with directional curvelet frames," Geophysical Journal International vol. 170, Issue 2, Aug. 2007, 19 pages.
Kim et al., "Increasing signal-to-noise ratio of marine seismic data: a case study from offshore Korea," Journal of Applied Geophysics, vol. 134, Nov. 2016.
Li and Lu, "Demultiple strategy combining Radon filtering and Radon domain adaptive multiple subtraction," Journal of Applied Geophysics, vol. 103, Apr. 2014, 11 pages.
Rickett et al., "P167—Adaptive multiple subtraction with non-stationary helical shaping filters," EAGE 63rd Conference and Technical Exhibition, Jun. 11-15, 2001, 4 pages.
Spitz, "Pattern recognition, spatial predictability and subtraction of multiple events," the Leading Edge, Jan. 1999, 4 pages.
Ventosa et al., "Adaptive multiple subtraction with wavelet-base complex urary Wiener filters," Jun. 2018, published in Geophysics vol. 77, Nov.-Dec. 2012, 18 pages.
Verschuur et al., "Adaptive surface-related multiple elimination," Geophysics vol. 57, No. 9, Sep. 1992, 12 pages.
Wang, "Multiple subtraction using an expanded multichannel matching filter," Geophysics vol. 68, No. 1, Jan.-Feb. 2003, 9 pages.
Wiggins, "Multiple attenuation by explicit wave extrapolation to an interpreted horizon," the Leading Edge, Jan. 1999, 7 pages.
Xue et al., "Amplitude-perserving nonlinear adaptive multiple attenuation using the high order sparse Radon Transform," Sinopec Geophysical Research Institute, IOP Science, Journal of Geophysics and Engineering, vol. 31, No. 3, Apr. 2016, 2 pages.
Dafni et al., "Diffraction imaging by prestack reverse-time migration in the dip angle domain: diffraction imaging by reverse-time migration," Geophysical Prospecting, Oct. 2017, 65(14):295-316.
PCT International Search Report and Written Opinion in International Appln. No. PCT/US2020/049045, dated Dec. 15, 2020, 19 pages.
GCC Examination Report in GCC Appln. No. GC 2019-37569, dated Nov. 24, 2020, 5 pages.
Gong et al., "Polarized Wavefield Magnitudes with Optical Flow for Elastic Angle-Domain Common-Image Gathers," Geophysics, Jul.-Aug. 2016, 81(4):S239-S251.
Gulf Cooperation Council Examination Report issued in GCC Appln. No. GC 2018-35094 dated Mar. 4, 2020, 3 pages.
Bahorich and Farmer, "3D Seismic Discontinuity for Faults and Stratigraphic Features: the Coherence Cube," The Leading Edge, vol. 14, Oct. 1995, 6 pages.
Chen et al., "Directly imaging steeply-dipping fault zones in geothermal fields with multicomponent seismic data," Geothermics, vol. 57, Sep. 2015, 31 pages.
Fei et al., "An Endemic Problem in Reverse-Time Migration," 84th Annual International Meeting, SEG, Expanded Abstracts, 2014, pp. 3811-3815.
Fei et al., "Removing False Images in Reverse-Time Migration: The Concept of De-Primary," Geophysics, 80, No. 6, Nov.-Dec. 2015, pp. S237-S244.
Fletcher, "Suppressing Unwanted Internal Reflections in Prestack Reverse-Time Migration," Geophysics, vol. 71, No. 6, Nov.-Dec. 2006, pp. E79-E82.
Fomel, "Theory of 3-D Angle Gathers in Wave-Equation Imaging," 74th Annual International Meeting, SEG, Expanded Abstracts, Oct. 2004, pp. 1053-1056.
Forestiere et al., "Oligomerization of Monoolefins by Homogenous Catalysts," Oil & Science and Technology Review de l'Institute Francais du Petrole, vol. 64, No. 6, Nov. 2009, pp. 663-664, 20 pages.
Hu et al., "Angle gathers from reverse time migration using analytic wavefield propagation and decomposition in the time domain," Geophysics, vol. 81, No. 1, Jan. 1, 2016, 9 pages.
Kim et al., "3D Least-Squares Reverse Time Migration Using Wavefield Decomposition via Hilbert transform," 79th EAGE Conference & Exhibition, Jun. 12, 2017, 5 pages.
Liu et al., "An Effective Imaging Condition for Reverse-Time Migration using Wavefield Decomposition," Geophysics, vol. 76, No. 1, Jan. 2011, pp. S29-S39.
Liu et al., "Imaging diffractors using wave-equation migration," Geophysics vol. 81, No. 6, Nov.-Dec. 2016, 10 pages.
Liu et al., "Reverse-Time Migration using One-Way Wavefield Imaging Condition," 77th Annual International Meeting, SEG Expanded Abstracts, 2007, pp. 2170-2174.
Luo et al., "Edge-preserving smoothing and applications," The Leading Edge, vol. 21, 2002, 5 pages.
Khaidukov et al., "Diffraction imaging by focusing-defocusing: An outlook on seismic superresolution," Geophysics, vol. 69, No. 6, Nov.-Dec. 2004, 13 pages.
Klokov et al., "Separation and imaging of seismic diffractions using migrated dip-angle gathers," Geophysics, vol. 77, No. 6, S131-S143. doi:10.1190/geo2012-0017.1.
Kong et al., "Diffraction separation by plane-wave prediction filtering," Chinese Geophysical Society, Appl. Geophys. (2017) 14: 399, Jul. 2017.
Landa et al., "Separation, imaging and velocity analysis of seismic diffractions using migrated dip-anle gathers," 78th Annual International Meeting, SEG, Expanded Abstracts, 2008, 5 pages.
Liu and Lu, "Diffraction Imaging Based on Dip Angle Gather of Seismic Wave Equation Migration," Near Surface Geophysics Asia Pacific Conference, Beijing, China, Jul. 17-19, 2013, 4 pages.
Mahdaviani et al, "Selective Ethylene Dimerization Toward 1-butene by a New Highly Efficient Catalyst System and Determination of Its Optimum Operating Conditions in a Buchi Reactor," International Journal of Chemical Engineering and Applications, vol. 1, No. 3, Oct. 2010, pp. 276-281, 6 pages.
Popovici et al., "High resolution diffraction imaging of small scale fractures in shale and carbonate reservoirs," Unconventional Resources Technology Conference, 2015, 9 pages.
Qin et al., "Kirchhoff preSDM interactive dip-gather stacking and dip illumination panel generation," 75th Annual International Meeting, SEG, Expanded Abstracts, 2005, 5 pages.
Sava et al. "Angle-Domain Common Image Gathers by Wavefield Continuation Methods," Geophysics, vol. 68, May-Jun. 2003, pp. 1065-1074.
Schoepp et al., "Multifocusing 3D diffraction imaging for detection of fractured zones in mudstone reservoirs: Case history," Interpretation 3(1), Feb. 2015, 12 pages.
Sturzu et al., "Diffraction imaging using specularity gathers," Journal Seismic Exploration vol. 23, Feb. 2014, 18 pages.
Sun et al., "Comparative study of dip-angle domain Gaussian beam migration and Kirchhoff migration in diffraction separation," SEG Technical Program Expanded Abstracts, 2014, 5 pages.
Taner et al., "Separation and imaging of seismic diffractions using plane-wave decomposition," SEG Technical Program Expanded Abstracts, 25(1), Jan. 2006.
Wang et al., "RTM Artifact Removal via a Fast Algorithm for Wavefield Decomposition," 2016 SEG International Exposition and 86th Annual Meeting, 2016.
Wang et al., "Up/down and P/S decompositions of elastic wavefields using complex seismic traces with applications to calculations Poynting vectors and angle-domain common-image gathers from reverse time migrations," Geophysics, vol. 81, No. 4, Jul. 2016, 15 pages.
Xu et al., "3D Angle Gathers from Reverse-Time Migration," Geophysics, vol. 76, No. 2, Mar.-Apr. 2011, pp. S77-S92.
Zhang et al., "Diffraction imaging using shot and opening angle gathers: A prestack time migration approach," Geophysics, vol. 79, No. 2, Mar.-Apr. 2014, 11 pages.
Zhang et al., "Efficient Wave-Equation-Based Diffraction Imaging," Geophysics, vol. 82, No. 5, Sep.-Oct. 2019, 11 pages.
Zhang et al., "Improving reverse time migration angle gathers by efficient wavefield separation," Geophysics, vol. 83, No. 2, Mar. 1, 2018, pp. S187-S195.

(56) References Cited

OTHER PUBLICATIONS

Zhang et al., "RTM angle gathers by optical flow with wavefield separation", SEG Technical Program Expanded Abstracts 2018, Aug. 27, 2018, 5 pages.
Zhang, "RTM Angle Gathers and Specular Filter (SF) RTM using Optical Flow," 84rd Annual International Meeting, SEG, Expanded Abstracts, Copyright 2014, pp. 3816-3820.
Gulf Cooperation Council Examination Report issued in GCC Appln. No. GC 2018-35094, dated Nov. 7, 2019, 4 pages.
PCT International Search Report and Written Opinion issued in International Appln. No. PCT/US2018/026071, dated Jul. 9, 2018, 15 pages.
PCT International Search Report and Written Opinion issued in International Appln. No. PCT/US2018/049834, dated Dec. 20, 2018, 17 pages.
PCT International Search Report and Written Opinion in International Appln. No. PCT/US2019/031421, dated Aug. 5, 2019, 17 pages.
GCC Examination Report in GCC Appln. No. GC 2019-37569, dated Jun. 6, 2021, 4 pages.
PCT International Search Report and Written Opinion in International Appln. No. PCT/US2021/021484, dated Jun. 24, 2021, 13 pages.
GCC Examination Report in GCC Appln. No. GC 2019-37569, dated Jun. 29, 2020, 4 pages.
CN Office action in Chinese Appln. No. 201880037535.2, dated Apr. 30, 2021, 21 pages (With English Translation).
He et al., "Reflection waveform inversion with variable density." Journal of Applied Geophysics 170, 103827, Nov. 2019, 16 pages.
PCT International Search Report and Written Opinion in International Appln. No. PCT/US2021/012193, dated Apr. 20, 2021, 18 pages.
PCT International Search Report and Written Opinion in International Appln. No. PCT/US2020/064511, dated Apr. 1, 2021, 17 pages.
Wang et al., "Reverse Time Migration with Hilbert Transform Based Full Wavefield Decomposition" Chinese Journal of Geophysics—Chinese Edition 59.11, Nov. 2016, 4200-4211, 12 pages.
Zhong et al., "Reverse Time Migration of Ground-Penetrating Radar with Full Wavefield Decomposition Based on the Hilbert Transform" Geophysical Prospecting 68.4, Apr. 2020, 1097-1112, 16 pages.

\* cited by examiner

IDENTIFYING GEOLOGIC FEATURES IN A SUBTERRANEAN FORMATION USING SEISMIC DIFFRACTION AND REFRACTION IMAGING

TECHNICAL FIELD

The present disclosure generally relates to an approach for identifying geologic features in a subterranean formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from other sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This disclosure describes systems and methods for a low-frequency reverse time migration (RTM) imaging condition-based technique to image subsurface geologic features using diffracted and refracted seismic waves. This approach has the ability to clearly reveal important geologic features, such as isolated scatterers, reflector edges, fault surfaces, fracture zones, and erosional surfaces that are often of high interest in seismic exploration.

The seismic imaging system uses a closed-loop workflow for probing the wave paths of the seismic signals emitted from the seismic source location and received by the seismic sensor at the receiver location. Generally, the described processes include the following steps. Source and receiver wavefields are decomposed into their respective vertical and horizontal directions. The vertical and horizontal directions direction can be defined along the direction emitted from the source or receiver to corresponding direction in two dimensional (2D) case. An imaging condition for removing a positive or negative wave-number component along the vertical direction, which is also called a depth direction. An RTM image is generated from the seismic waves received at the seismic receiver, which generates two signal terms and two noise terms. The noise terms represent low frequency RTM noise, which are usually filtered from the RTM image. However, rather than applying a Hilbert transform to the RTM image, the seismic imaging system applies the Hilbert transform to the low frequency RTM noise.

The described implementations can provide various technical benefits. For instance, diffraction imaging can increase the spatial resolution of the seismic images beyond the conventional means to provide to the interpreters with high-resolution structural and stratigraphic sections. The seismic imaging system is configured to receive data representing seismic waves received at seismic receivers and a known velocity model as inputs, which are data that are easily obtained. From these input data, the seismic imaging system generates output data representing wave paths of the seismic waves from the source to receiver locations, even when the arrivals of the seismic waves are out of order at the receivers with respect to when each was emitted at a seismic source.

The systems and devices can include one or more of the following embodiments.

In an aspect, a system for seismic imaging of a subterranean geological formation includes a wavefield generation module configured to generate a source wavefield from seismic data representing a subterranean formation and generate a receiver wavefield from the seismic data representing the subterranean formation. The system includes a wavefield decomposition module configured to decompose the source wavefield to extract a source depth component and decompose the receiver wavefield to extract a receiver depth component. The system includes a wave transform module configured to apply a transform to each of the source depth component and the receiver depth component. The system includes a cross-correlation module configured to combine the source depth component and the receiver depth component to generate an imaging condition and extract a low-frequency term from the imaging condition to generate a wave-path tracking data. The system includes an image rendering module configured to generate a wave path from the wave-path tracking data and render a seismic image of at least a portion of the subterranean geological formation from the generated wave path.

In some implementations, the wavefield decomposition module is configured to segment, into a time window, the receiver wavefield from a plurality of received wavefields. In some implementations, generating the enhanced seismic image reduces a computation cost by at least 50% relative to a computation cost of generating the enhanced seismic image independent from applying the imaging condition. In some implementations, the image rendering module is configured to determine velocities of emitted seismic waves that form shingle waves and tail waves in a near surface region of the subterranean geological formation. In some implementations, decomposing each of the source wavefield and the receiver wavefield comprises a Hilbert transform with respect to an axis orthogonal to a surface of the subterranean geological formation. In some implementations, an up-going component of each of the source wavefield and the receiver wavefield is oriented toward a surface of the subterranean geological formation, and a down-going component of each of the source wavefield and the receiver wavefield is oriented away from the surface of the subterranean geological formation. In some implementations, the waveform rendering module is configured to render the seismic image for presentation on a user interface.

In an aspect, a process for seismic imaging of a subterranean geological formation includes generating a source wavefield from seismic data representing a subterranean formation. The process includes generating a receiver wavefield from the seismic data representing the subterranean formation. The process includes decomposing the source wavefield to extract a source depth component. The process includes decomposing the receiver wavefield to extract a receiver depth component. The process includes applying a transform to each of the source depth component and the receiver depth component. The process includes combining the source depth component and the receiver depth component to generate an imaging condition. The process includes extracting a low-frequency term from the imaging condition to generate a wave-path tracking data. The process includes generating a wave path from the wave-path tracking data; and rendering a seismic image of at least a portion of the subterranean geological formation from the generated wave path.

In some implementations, the process includes segmenting, into a time window, the receiver wavefield from a plurality of received wavefields. In some implementations, generating the enhanced seismic image in reduces a computation cost by at least 50% relative to a computation cost of generating the enhanced seismic image independent from applying the imaging condition. In some implementations, the process includes determining velocities of emitted seismic waves that form shingle waves and tail waves in a near surface region of the subterranean geological formation. In some implementations, the process includes decomposing each of the source wavefield and the receiver wavefield by performing a Hilbert transform with respect to an axis orthogonal to a surface of the subterranean geological formation. In some implementations, an up-going component of each of the source wavefield and the receiver wavefield is oriented toward a surface of the subterranean geological formation, and a down-going component of each of the source wavefield and the receiver wavefield is oriented away from the surface of the subterranean geological formation. In some implementations, the process includes rendering the seismic image for presentation on a user interface.

In an aspect, one or more non-transitory computer readable media storing instructions that are executable by one or more processors are configured to perform operations including generating a source wavefield from seismic data representing a subterranean formation. The operations include generating a receiver wavefield from the seismic data representing the subterranean formation; decomposing the source wavefield to extract a source depth component. The operations include decomposing the receiver wavefield to extract a receiver depth component. The operations include applying a transform to each of the source depth component and the receiver depth component. The operations include combining the source depth component and the receiver depth component to generate an imaging condition. The operations include extracting a low-frequency term from the imaging condition to generate a wave-path tracking data. The operations include generating a wave path from the wave-path tracking data. The operations include rendering a seismic image of at least a portion of the subterranean geological formation from the generated wave path.

In some implementations, the operations include segmenting, into a time window, the receiver wavefield from a plurality of received wavefields. In some implementations, generating the enhanced seismic image in reduces a computation cost by at least 50% relative to a computation cost of generating the enhanced seismic image independent from applying the imaging condition. In some implementations, the operations include determining velocities of emitted seismic waves that form shingle waves and tail waves in a near surface region of the subterranean geological formation. In some implementations, the operations include decomposing each of the source wavefield and the receiver wavefield by performing a Hilbert transform with respect to an axis orthogonal to a surface of the subterranean geological formation. In some implementations, an up-going component of each of the source wavefield and the receiver wavefield is oriented toward a surface of the subterranean geological formation, and a down-going component of each of the source wavefield and the receiver wavefield is oriented away from the surface of the subterranean geological formation. In some implementations, the operations include rendering the seismic image for presentation on a user interface.

The details of one or more embodiments are set forth in the accompanying drawings and the description below. Other features and advantages will be apparent from the description and drawings, and from the claims.

DETAILED DESCRIPTION

Seismic images can be viewed as photographs for underground layers of rocks. These images can be formed from different probing elastic waves while various images can made from the echoes of these waves that reflect different rock properties. Generally, reflections and diffractions are the main seismic signal events providing subsurface information. Seismic imaging and inversion of reflections are the workflows in the industry to reveal subsurface geologic structure and stratigraphy and to generate rock properties for reservoir characterization.

The near-surface area of a subterranean formation can be complex, as the number of reflections and diffractions can be increased, relative to a number of reflections and diffractions for deeper, simpler subterranean formations. As the complexity of the near surface decreases, so do the number of or the presence of shingle waves diminish. For example, near a surface of the subterranean formation, shingle waves can form as a result of probing using seismic waves from a seismic source. Shingle waves include waves that are generated from a seismic sources and which arrive simultaneously (or otherwise near in time to one another) at a seismic receiver. The emitted waves overlap one another at the receiver, and thus it can be difficult to determine which received wave corresponds to a particular emitted signal. This makes velocity measurement difficult, because ray-based theory generally fails to properly characterize the shingle-wave phenomenon. Such a seismic imaging device does not reliably select "proper" travel time used for inversion.

This document describes a seismic imaging system configured to determine velocities of emitted seismic waves in the near surface region, which can introduce complexities to measuring velocities of the seismic waves emitted. Generally, a near surface region includes the range of subsurface is determined by the data acquisition range. The range is generally between the surface to as deep as 2-3 kilometers below the surface. Near surface imaging can be particularly useful for offshore geological formations, but the seismic imaging system can also uses near surface imaging for on shore mapping. The seismic imaging system is configured to determine where those seismic waves are generated by utilizing a reverse time migration (RTM) wave-path tracking method configured to distinguish among waves received at a seismic receiver and associate each wave with a source wave emitted from a seismic source.

More specifically, the seismic imaging system described herein is configured to trace seismic wave propagation paths, carried out after injection of a wavelet at the source location and backward in time propagating the received signal from the receiver location, followed by an imaging condition to remove the traditional imaging terms.

Figure 1:
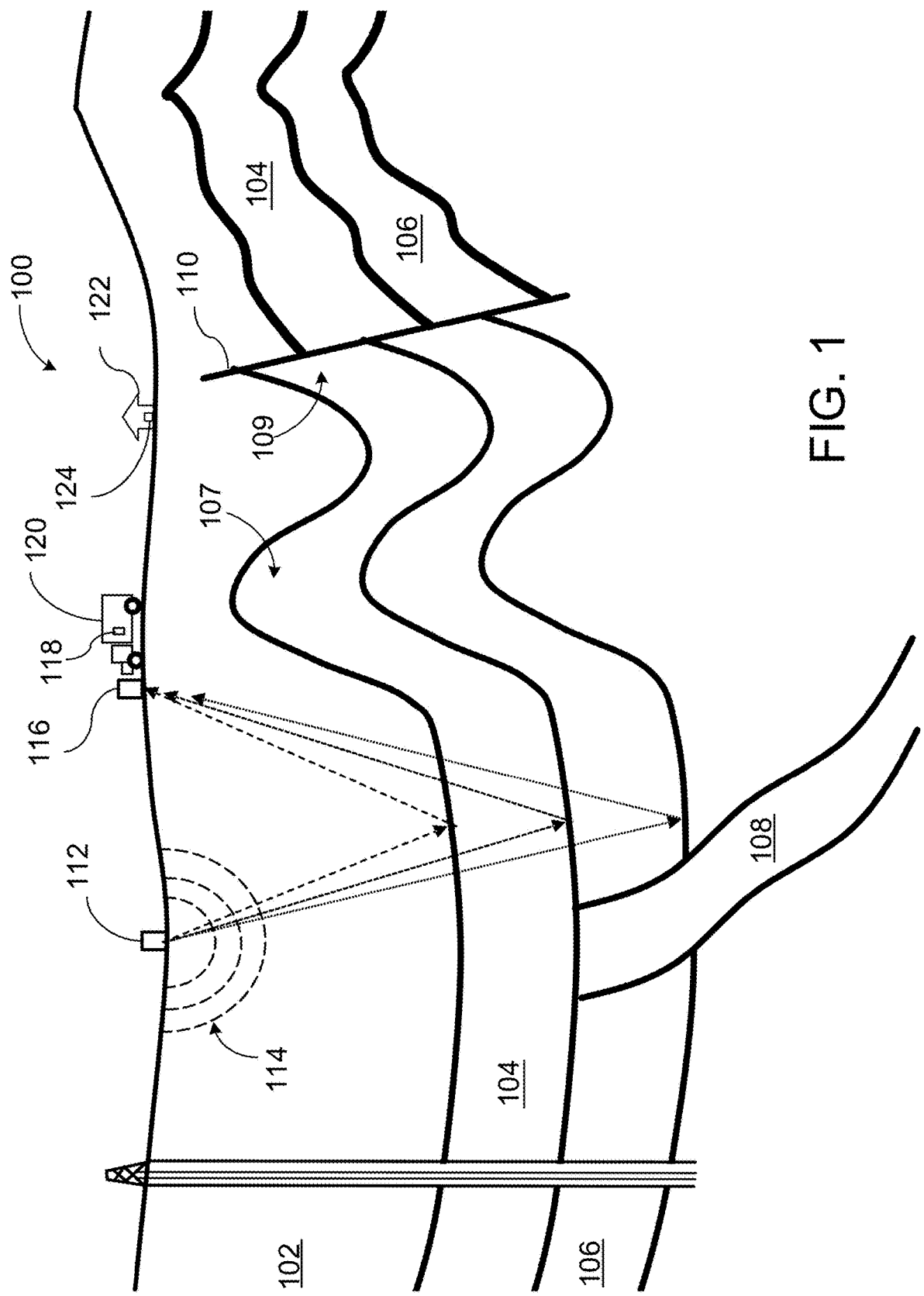
FIG. 1 is a schematic view of a seismic survey being performed to map subterranean features such as facies and faults.

FIG. 1 is a schematic view of a seismic survey being performed to map subterranean features such as facies and faults in a subterranean formation 100. The seismic survey provides the underlying basis for implementation of the systems and methods described with reference to FIGS. 4A-4B. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow along with clay material between the walls traps the petroleum. Other traps include salt domes and stratigraphic traps.

A seismic source 112 (for example, a seismic vibrator or an explosion) generates seismic waves 114 that propagate in the earth. The velocity of these seismic waves depends on several properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interfaces reflect some of the energy of the seismic wave and refracts some of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate output signals in response to received seismic waves including waves reflected by the horizons in the subterranean formation 100. The sensors 116 can be geophone-receivers that produce electrical output signals transmitted as input data, for example, to a computer 118 on a seismic control truck 120. In some implementations, the computer 118 can be in a building or other structure 122 that is remote from the subterranean formation. Based on the input data, the computer 118 may generate a seismic data output, for example, a seismic two-way response time plot. Generally the computer 118 includes a seismic imaging system 250 described in relation to FIG. 5. The seismic imaging system 250 of the computer is configured to receive the seismic data from the sensors 116 and a velocity module of seismic waves 114 generated by the source(s) 112. The seismic imaging system is configured to generate a seismic image representing the path(s) of the seismic waves 114 through the subterranean formation 100, specifically with respect to near surface locations (less than 100 feet deep) in the formation.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. In some implementations, the control center 122 includes the seismic imaging system 250. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing the subterranean formation 100. The seismic cube can also be display results of the analysis of the seismic data associated with the seismic survey.

Figure 2:
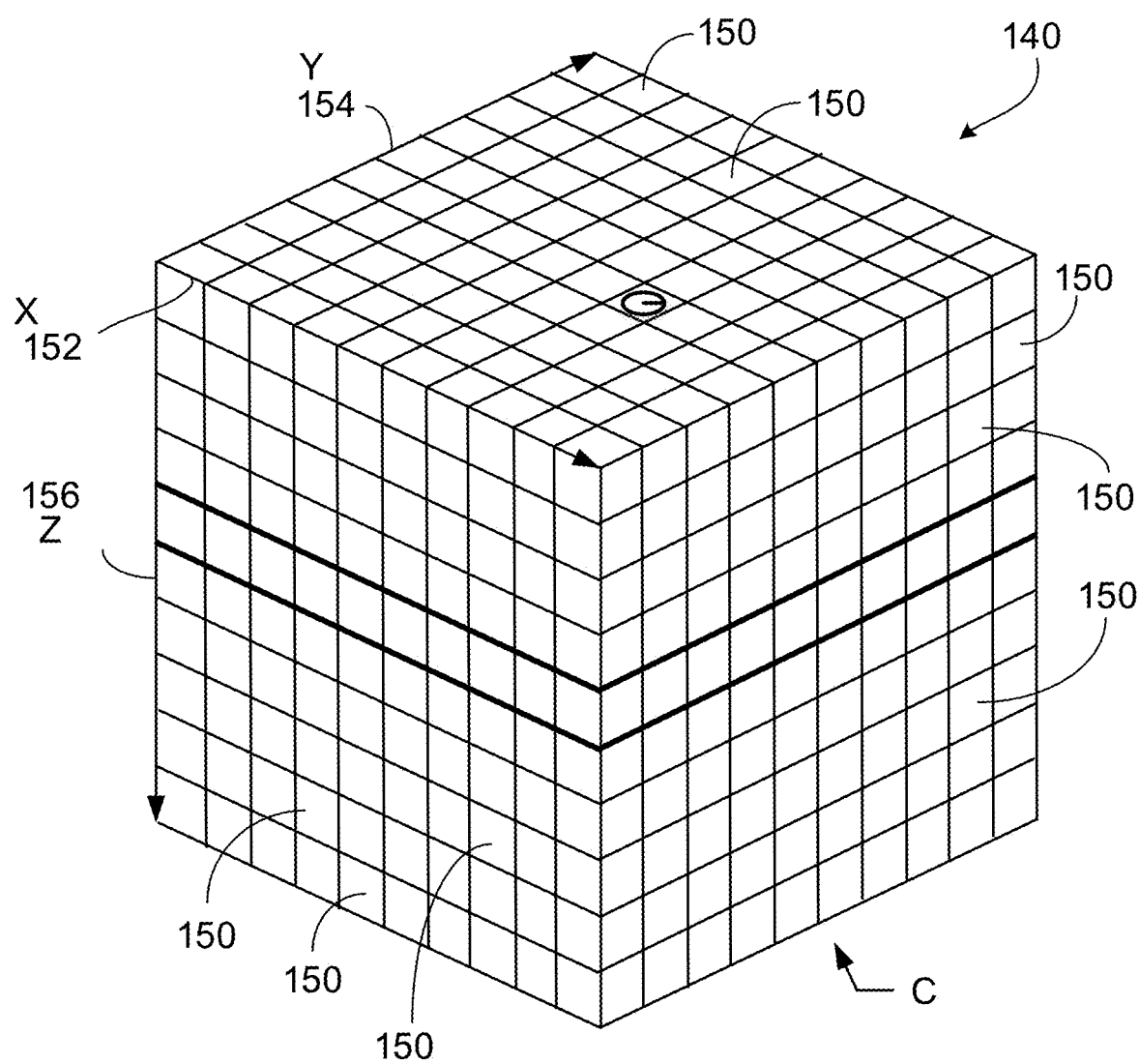
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and a delta-Z offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150. As subsequently described, the imaging condition of the seismic imaging system is configured to perform Hilbert transforms on the vertical delta-Z components of the seismic waves.

Figure 3:
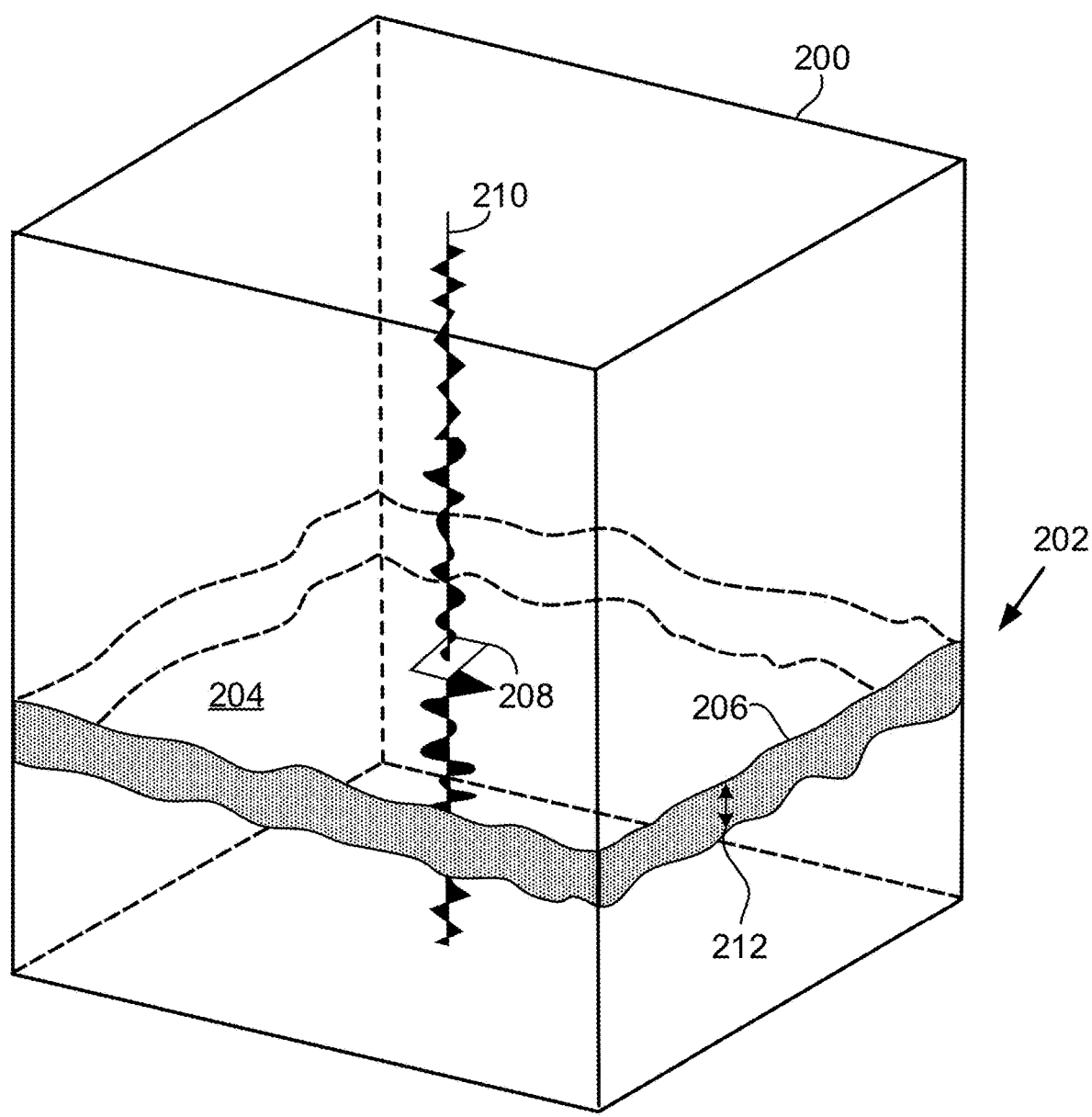
FIG. 3 illustrates a stratigraphic trace within the three-dimensional cube of FIG. 2.

FIG. 3 illustrates a seismic cube 200 representing a formation. The seismic cube has a stratum 202 based on a surface (for example, amplitude surface 204) and a stratigraphic horizon 206. The amplitude surface 204 and the stratigraphic horizon 206 are grids that include many cells such as exemplary cell 208. Each cell is a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4A:
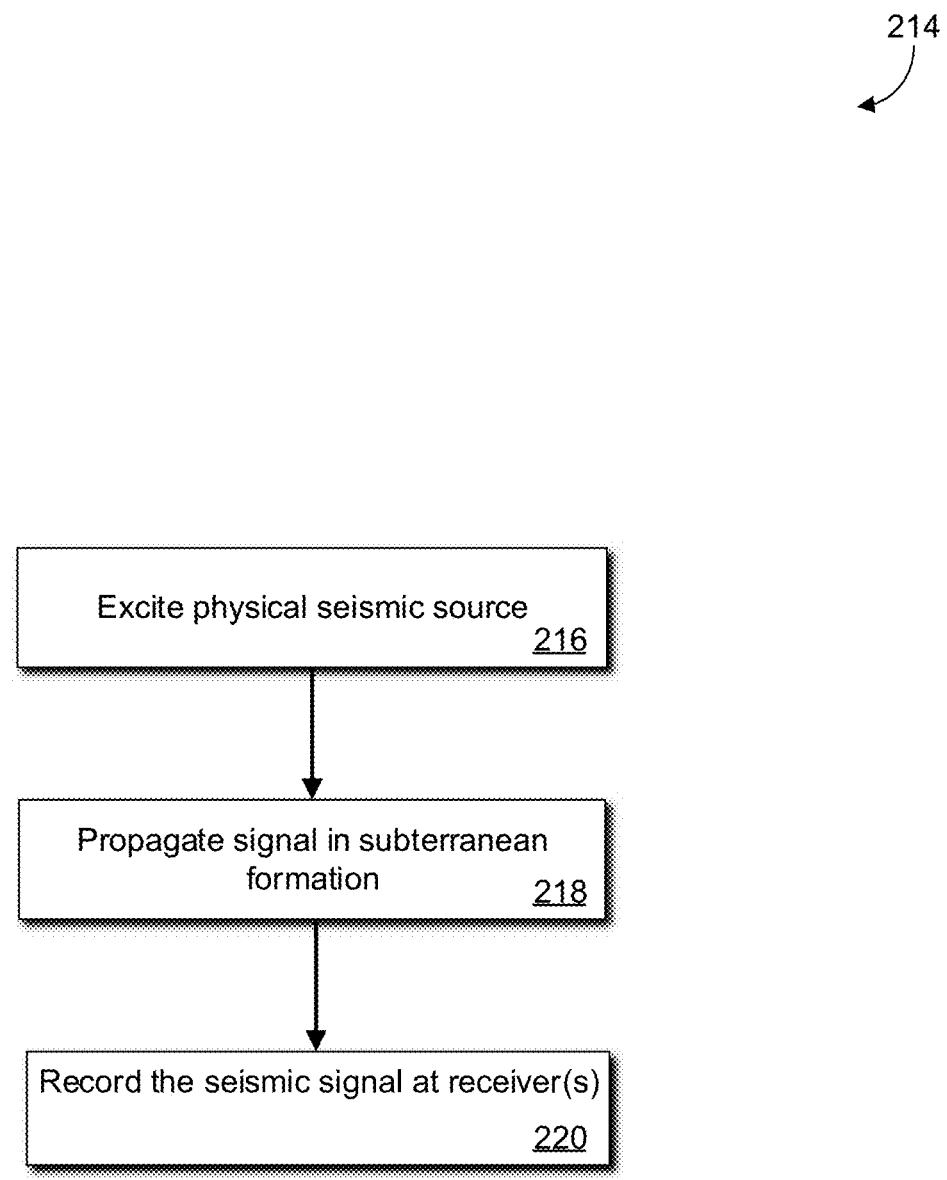
FIGS. 4A-4B illustrate flow diagrams including example processes for identifying geologic features in a subterranean formation using seismic diffraction imaging.
Figure 4B:
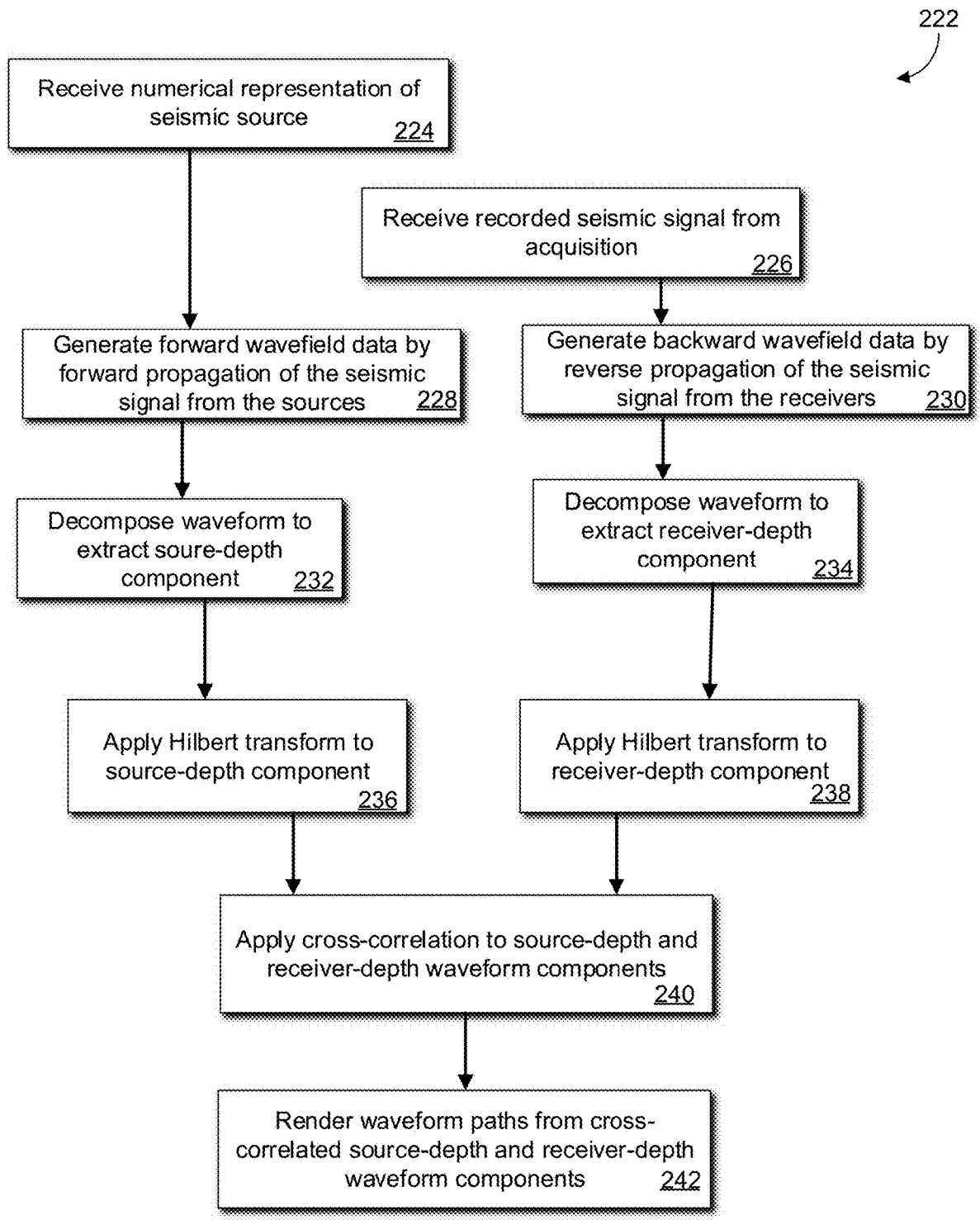
Figure 5:
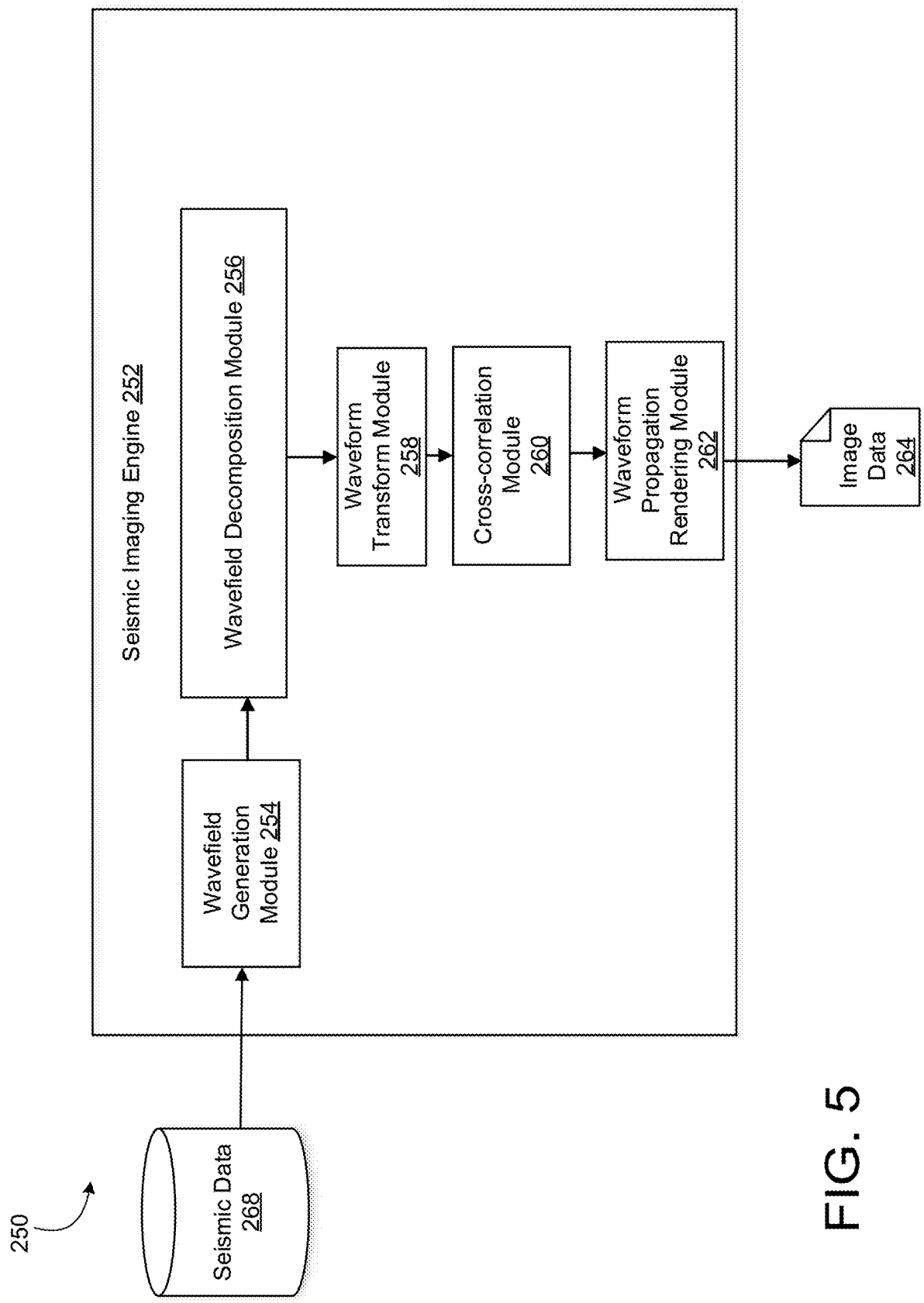
FIG. 5 is a block diagram of an example system for identifying geologic features in a subterranean formation using seismic diffraction imaging.

FIGS. 4A-4B illustrate flow diagrams including example processes 214 and 222, respectfully, for identifying geologic features in a subterranean formation using seismic diffraction imaging. FIG. 5 shows a seismic imaging system 250 for identifying geologic features in a subterranean formation using seismic diffraction imaging. The seismic imaging system 250 of FIG. 5 is configured to execute the processes 222 of FIG. 4B.

Turning to FIG. 4A, a process 214 performed by a physical acquisition system (such as a part of system described in relation to FIG. 1) is shown. One or more sources (such as source 112 of FIG. 1) are excited (216) to generate a seismic signal in the formation 100. The seismic signal is propagated (218) through subterranean formation 100 and recorded (220) at receiver(s) (such as source 116 of FIG. 1). Generally, the seismic signal is propagated near the surface of the formation 100.

The recorded signal at the receiver and a numerical representation of the generated signal at the source can be used by the seismic imaging engine 252 of FIG. 5 for generating the diffraction image from a seismic model, as shown in process 220 of FIG. 4B. In an aspect, seismic imaging engine 252 is configured to receive the seismic data 268 and generate structure image data 264 of the subterranean formation using a series of modules. The modules can include a wavefield generation module 254, a waveform decomposition module 256, a waveform transform module 258, a cross-correlation module 260, and a waveform-propagation rendering module 262.

Describing the process 222 of FIG. 4B with the system 252 of FIG. 5, the wavefield generation module 254 is configured to obtain seismic data 268 that is generated by one or more sources and received by one or more receivers. In an example, the wavefield generation module 254 receives (224) the representation of the seismic signal in a subterranean formation. The wavefield generation module 254 receives (226) the seismic data 268 recorded by the receivers. The waveform generation module 254 generates (228) from the seismic data 268 forward wavefield data by forward propagation of the seismic signal from the sources. In other words, the waveform generation module 254 is configured to generate a source wavefield from source representing a subterranean formation. The waveform generation module 254 is configured to generate (230) backward wavefield data by reverse propagation of the seismic signal from the receivers. In other words the wavefield generation module 254 is configured to generate a receiver wavefield from the seismic data representing the subterranean formation.

The wavefield decomposition module 256 configured to decompose the source wavefield to generate (232) a source-depth component of the source waveform. The wavefield decomposition module 256 is configured to decompose the receiver wavefield to generate (234) a receiver depth component of the received waveform.

The waveform transform module 238 is configured to apply Hilbert transforms (236, 238) to each of the generated source-depth component of the source waveform and the receiver-depth component of the received waveform. The Hilbert transform is configured to remove the positive or the negative wave-number component along the depth direction of each of the waveforms.

The cross-correlation module 260 is configured to apply (240) an inner product of the source source-depth component and the receiver-depth component to generate a imaging condition that retains the low-velocity noise for waveform tracking and discards the RTM image.

The waveform propagation rendering module 262 is configured to render waveform paths from the source(s) 112 to the receivers 116 from the imaging condition of the cross-correlation module 260. This process is further described in relation to FIGS. 6-10.

Generally, generating the enhanced seismic image in reduces a computation cost substantially relative a computation cost of generating the enhanced seismic image independent from applying the imaging condition. For example, the computation cost of generating the seismic image can be reduced by at least 50% relative to a computation cost of generating the enhanced seismic image independent from applying the imaging condition. In some implementations, the computing cost may be reduced by 30-70%.

Figure 6:
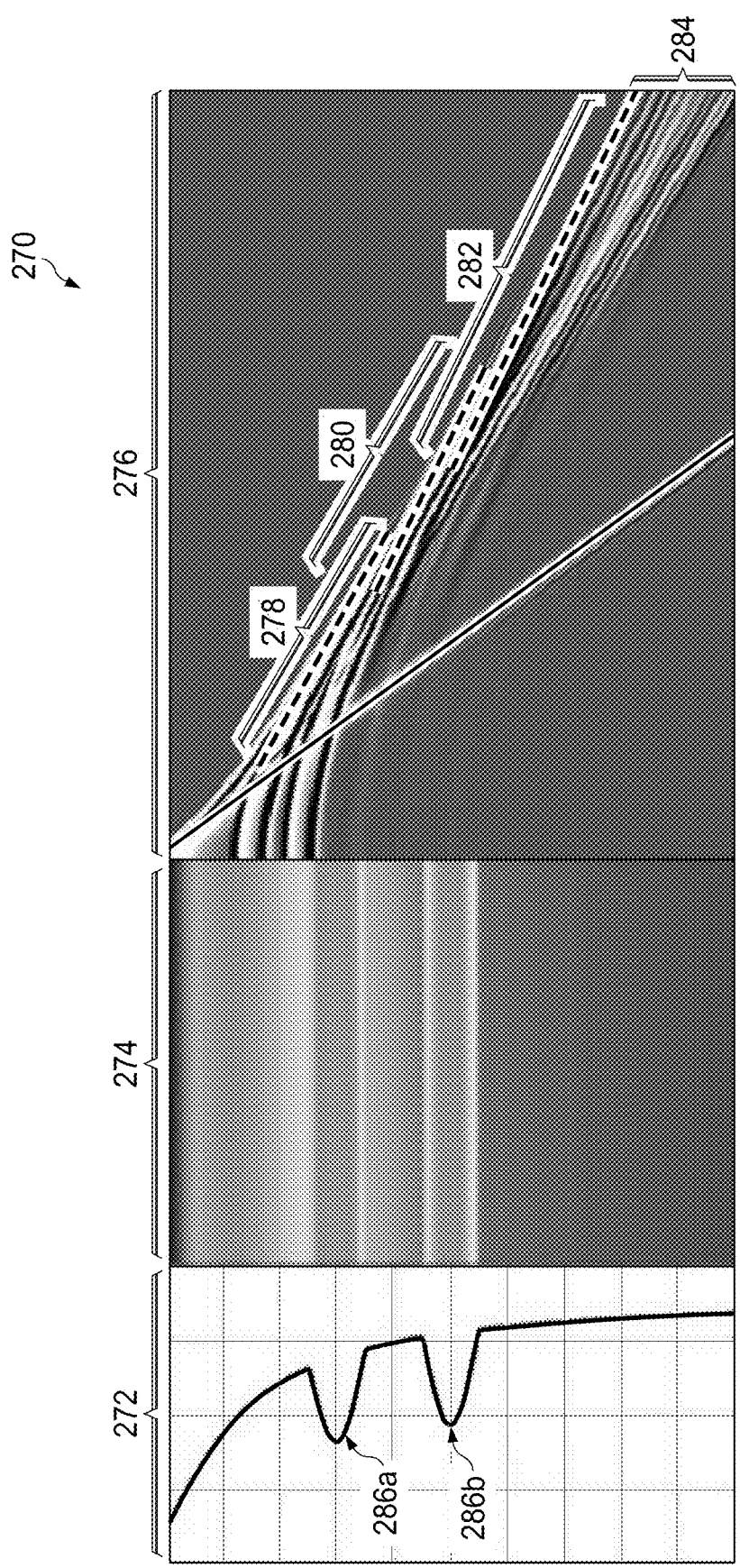
FIG. 6 shows an image illustrating an example of seismic shingle waves.

FIG. 6 shows an image 270 illustrating an example of seismic shingle waves in forward modeling data 276. The shingle waves appear as multiple or overlapped early arrivals to the receivers 116. In the forward modeling data 276 of FIG. 6, there are three shingle waves indicated by colored dotted lines, which are measured in accordance with the velocity data 274 and velocity distribution 272. A first shingle wave 278 is shown near the left. A second shingle wave 280 is shown in the center. A third shingle wave 282 is shown to the right. Tail waves 286 are below the third shingle wave 282.

The shingle waves 276 result from introducing a seismic signal into the geological formation 100 form the source(s) 112. A velocity distribution function 272 is shown. The velocity notches 286 represent discontinuities in the velocities of the seismic waves 114. The notches 286 show areas of low velocity. The low velocity notches and the sharp changes in velocity between the adjacent layers that produce the notches the cause of the three shingle waves 278, 280, 282 and the tail waves 284. The variation in velocity the result of the modeled subsurface formation.

The seismic imaging system 250 is configured to determine how and where these shingle waves are generated by utilizing the wave-path tracking process 222 of FIG. 4B. The process 222 of FIG. 4B is described Equation 1 includes the imaging condition of reverse time migration (RTM), including the multiplication of decomposed source-depth waveforms and receiver-depth waveforms.

$$I(x,z)=D_S U_R+U_S D_R+D_S D_R+U_S U_R \quad (1)$$

Figure 7:
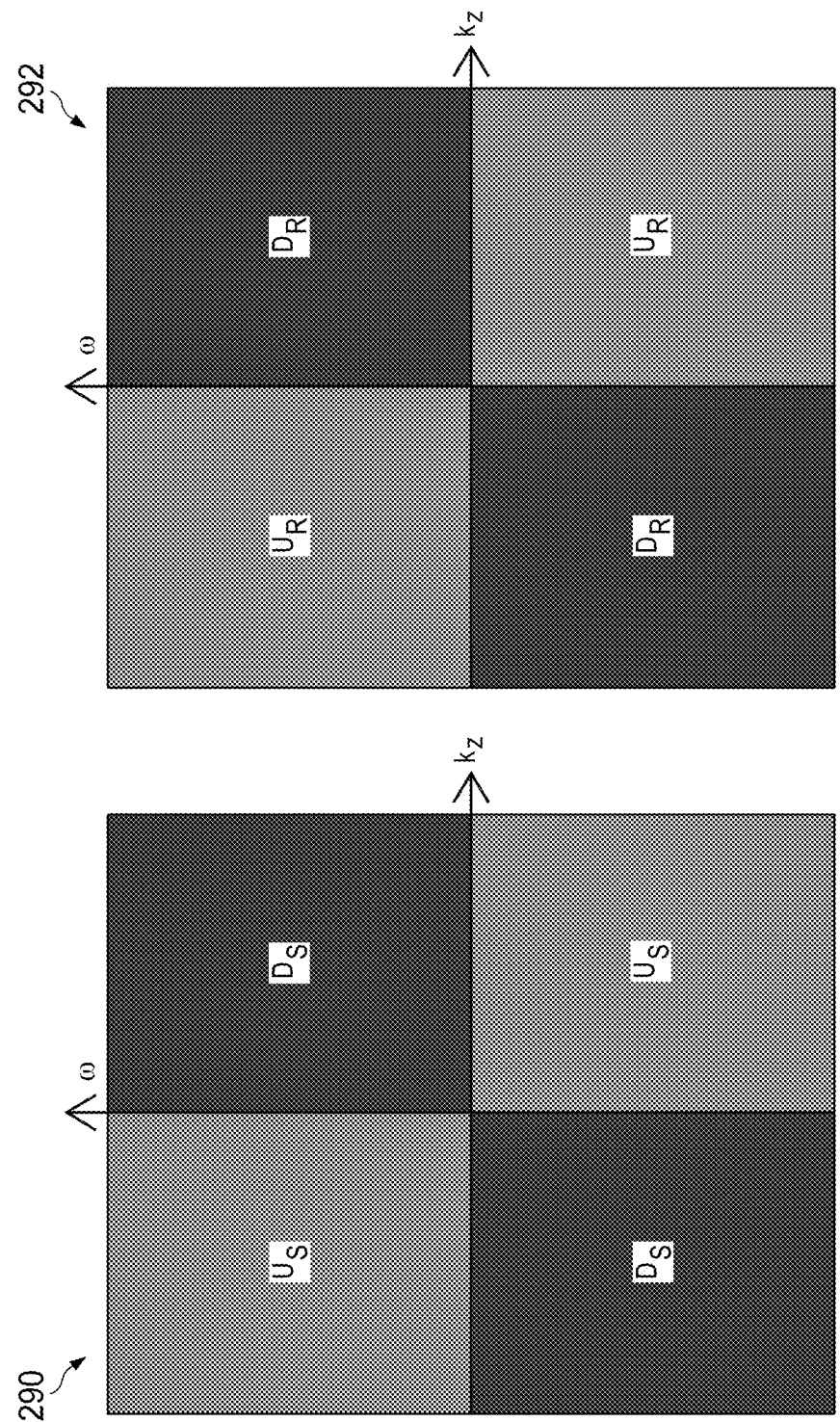
FIG. 7 shows an illustration of a reverse time migration (RTM) wave-path tracking imaging condition.

FIG. 7 shows an illustration of computing a reverse time migration (RTM) wave-path tracking imaging condition by breaking the source wavefield and the receiver wavefield into their components. Graph 290 shows the source wavefield components $U_S$ and $D_S$ for different angular frequencies ω. Graph 292 shows the receiver wavefield components $U_R$ and $D_R$ for different angular frequencies ω. In Equation (1), D represents a downward-propagating seismic signal. In Equation (1), U represents an upward-propagating seismic signal. In Equation (1), S represents a source wavefield and R represents a receiver wavefield. There are four total terms in Equation 1. The complete raw RTM image includes these four components. The first two terms ($D_S U_R+U_S D_R$) include the RTM image data. The latter two terms of Equation (1) ($D_S D_R+U_S U_R$) are typically referred to as the low frequency RTM noise which is removed from RTM images in typical RTM imaging.

For the process 222 of FIG. 4B, the seismic imaging system 250 operates on the latter two noise terms. Equation (2) is the imaging condition for retaining the two terms used by the wave-path tracking approach.

$$I(X,Z)=\int_0^{Tmax}(SR+h_z(S)h_z(R))dt \quad (2)$$

In Equation (2), $h_z$ represents the Hilbert transforms along depth directions, as performed in operations 236 and 238 of process 222. The seismic imaging system 250, by using this imaging condition, removes the RTM image data and retains the noise data for wave-path tracking. Thus the seismic imaging system removes the imaging terms $D_S U_R+U_S D_R$ are and preserves the wavepath terms $D_S D_R+U_S U_R$. Generally, the Hilbert transform $h_z$ is configured to remove the positive or negative wave-number component along the depth direction of the extrapolated wavefield.

Figure 8:
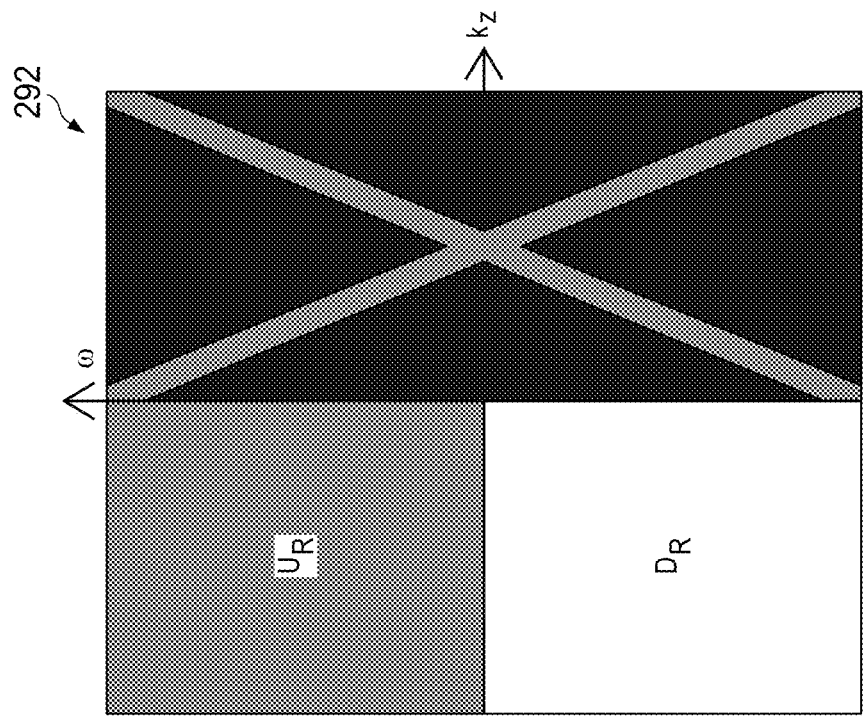
FIG. 8 shows an example of a reverse time migration (RTM) wave-path tracking imaging condition that retains noise terms for use in seismic imaging.
Figure 8:
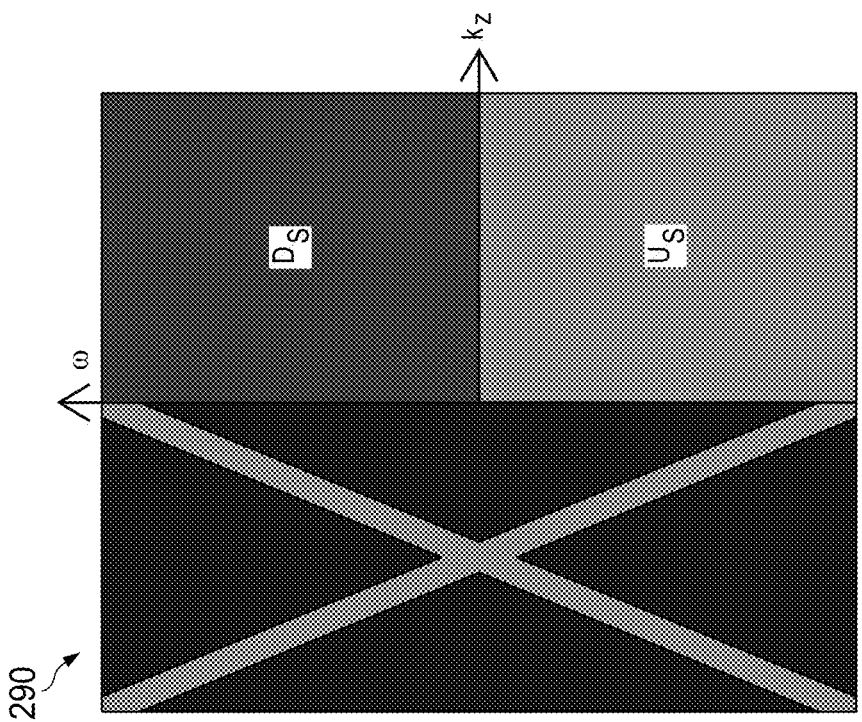

FIG. 8 shows an example of a reverse time migration (RTM) wave-path tracking imaging condition that retains noise terms for use in seismic imaging. Graph 300 shows the retained components $D_S$, $U_S$, of the source wavefield, and graph 302 shows the retained components $D_R$, $U_R$, of the receiver wavefield.

Generally, the seismic imaging system 250 using the imaging condition can extract both reflector and diffraction data from the source and receiver wavefields. The cross-correlation condition of step 240 refers to a zero-lag cross-correlation between the source and receiver wavefields.

Figure 9A:
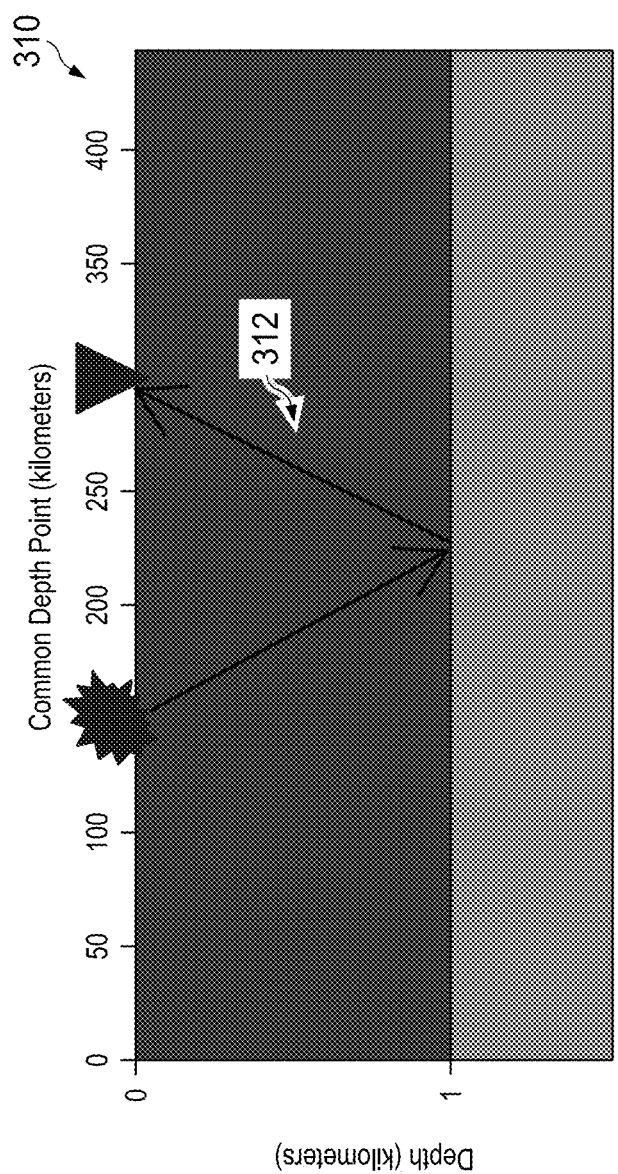
FIGS. 9A-9D show a sequence of images representing an application of the imaging condition of FIGS. 7-8 to simulated seismic wave data.

FIGS. 9A-9D show a sequence of images representing an application of the imaging condition of FIGS. 7-8 to simulated seismic wave data. The simulated data for this example include a two layer synthetic wavefield. FIG. 9A shows a velocity model 310 with one source and one receiver at the surface. The wavefield 312 reflects back toward a surface (depth=0 km). The velocity increases from 1500 m/s to 4500 m/s along Z-direction with two low velocity notches. The synthetic shot gather is generated using a finite difference solution to the 2D acoustic wave equation. The shingle waves (similar to 278, 280, and 282) of FIG. 6 are generated from this wavefield.

Figure 9B:
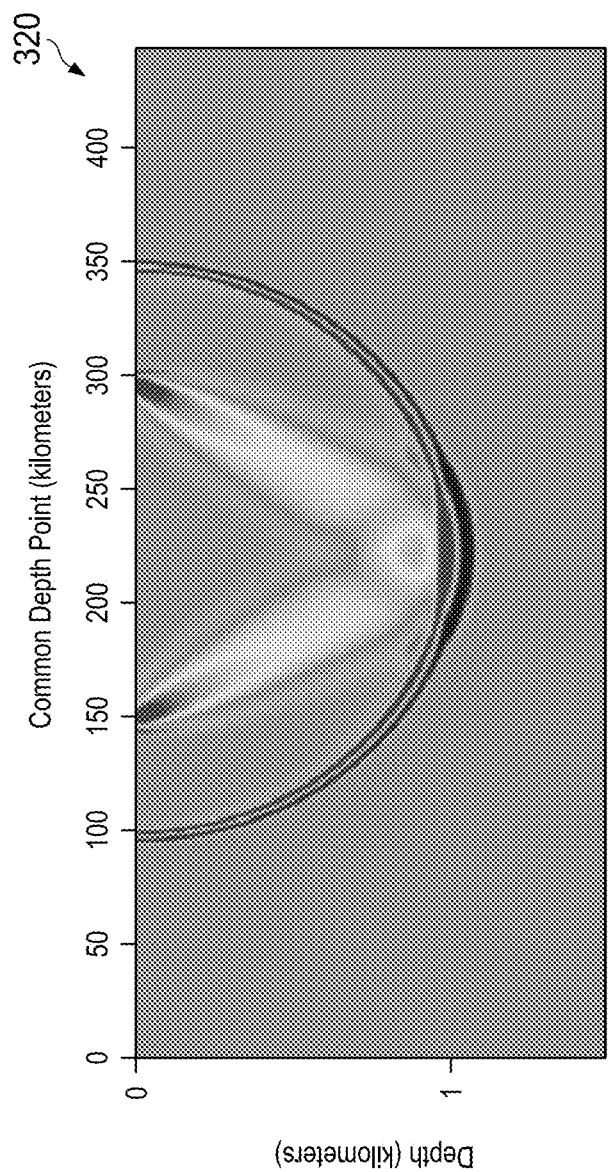
Figure 9C:
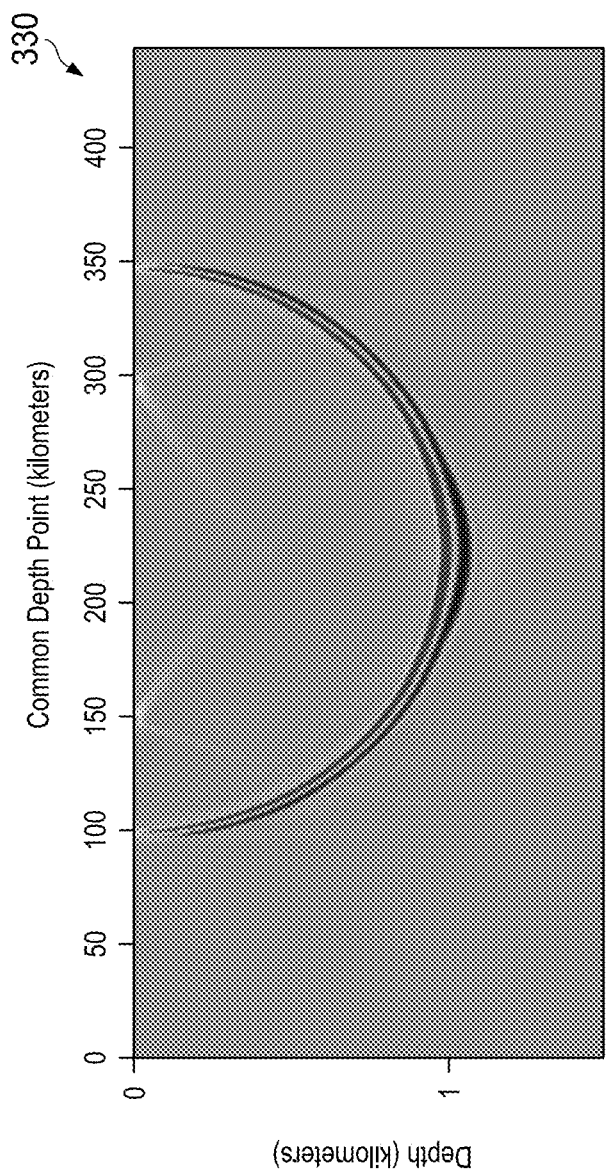
Figure 9D:
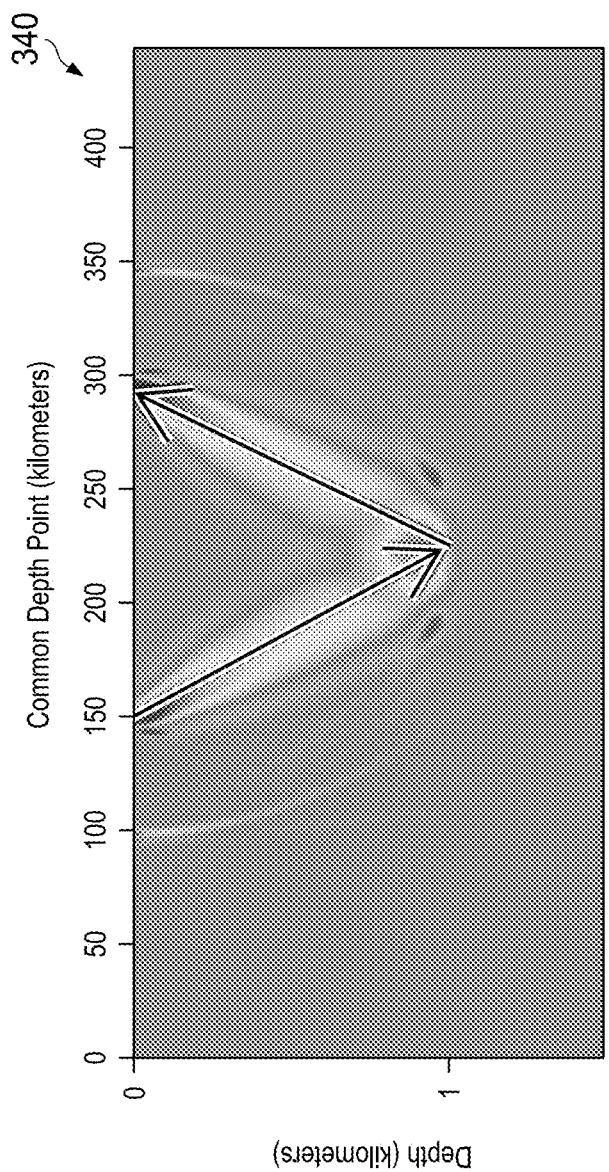

FIG. 9B shows an impulse response 320 using a RTM imaging condition that preserves the first two components $D_S U_R+U_S D_R$ of Equation (1) and preserves the latter two noise components $D_S D_R+U_S U_R$. FIG. 9C shows an impulse response 330 using a RTM imaging condition that preserves the first two components $D_S U_R+U_S D_R$ of Equation (1) and discards the latter two noise components $D_S D_R+U_S U_R$. FIG. 9D shows an impulse response 340 using a RTM imaging condition that discards the first two components $D_S U_R+U_S D_R$ of Equation (1) and preserves the latter two wavepath components $D_S D_R+U_S U_R$. The impulse response 340 shows the wave path generated from Equation (2).

Figure 10A:
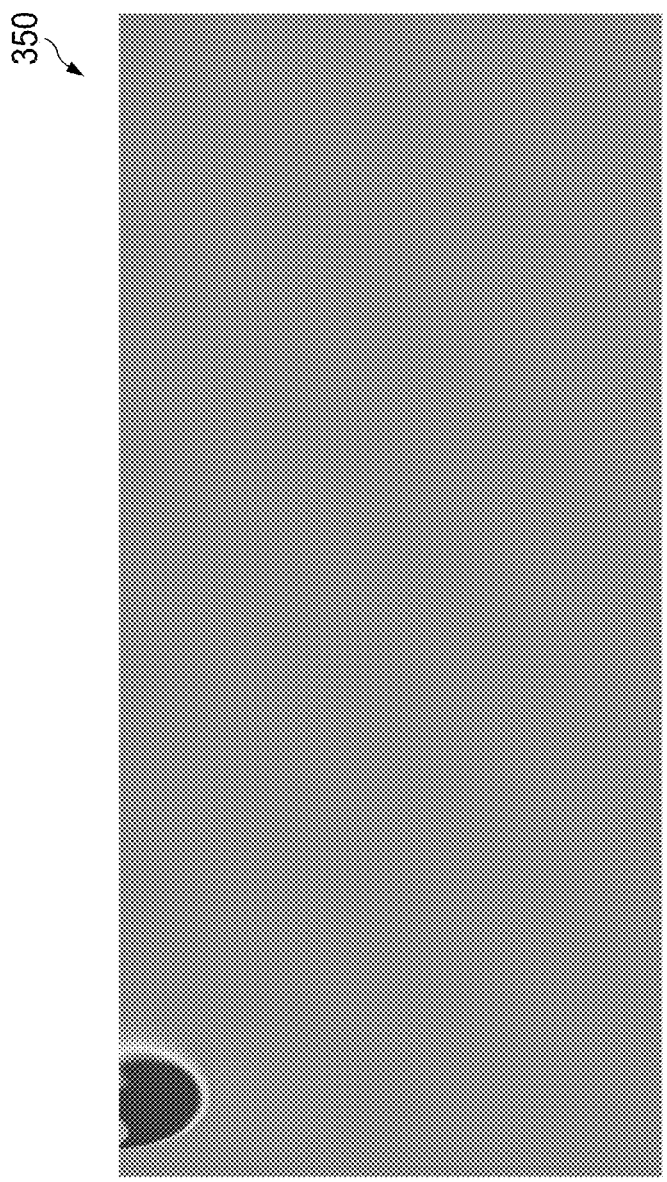
FIGS. 10A-10D show a sequence of images representing wave path tracking results of the seismic imaging system for shingle and tail seismic waves from FIG. 6, using the imaging condition of FIG. 8.
Figure 10B:
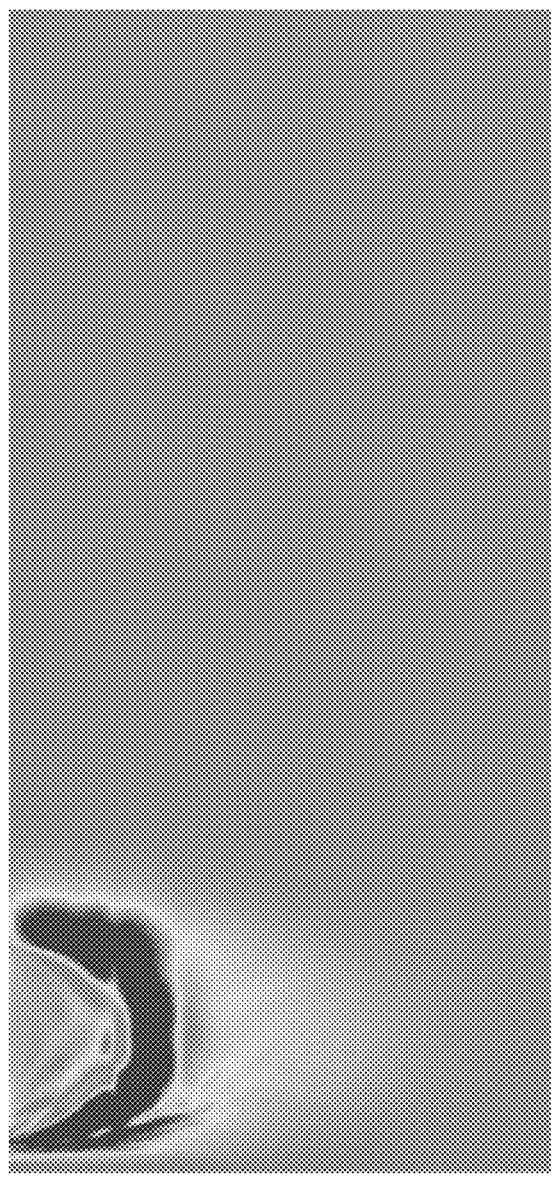
Figure 10C:
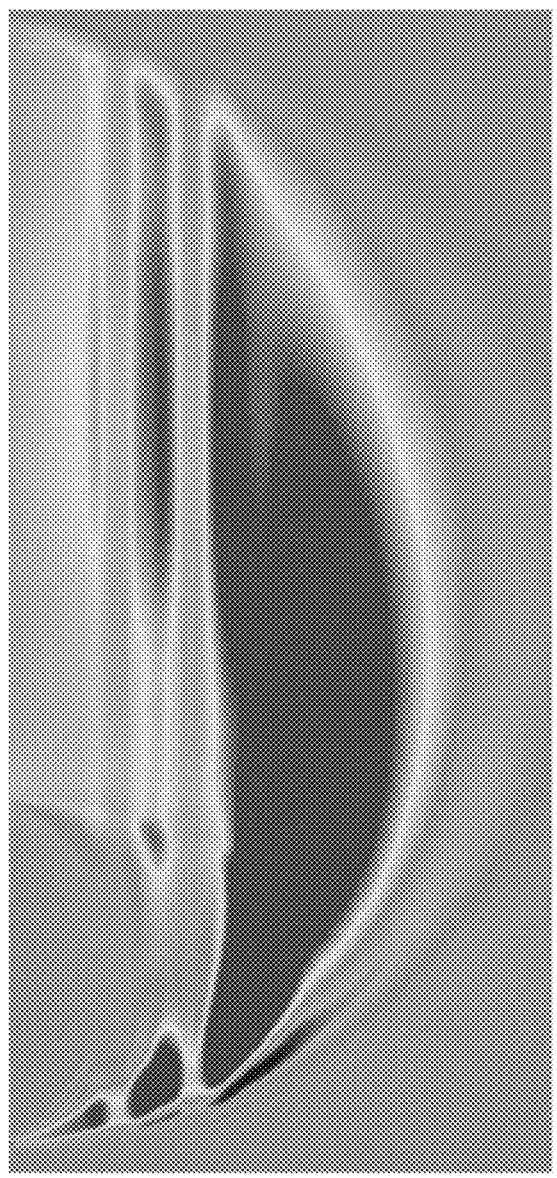
Figure 10D:
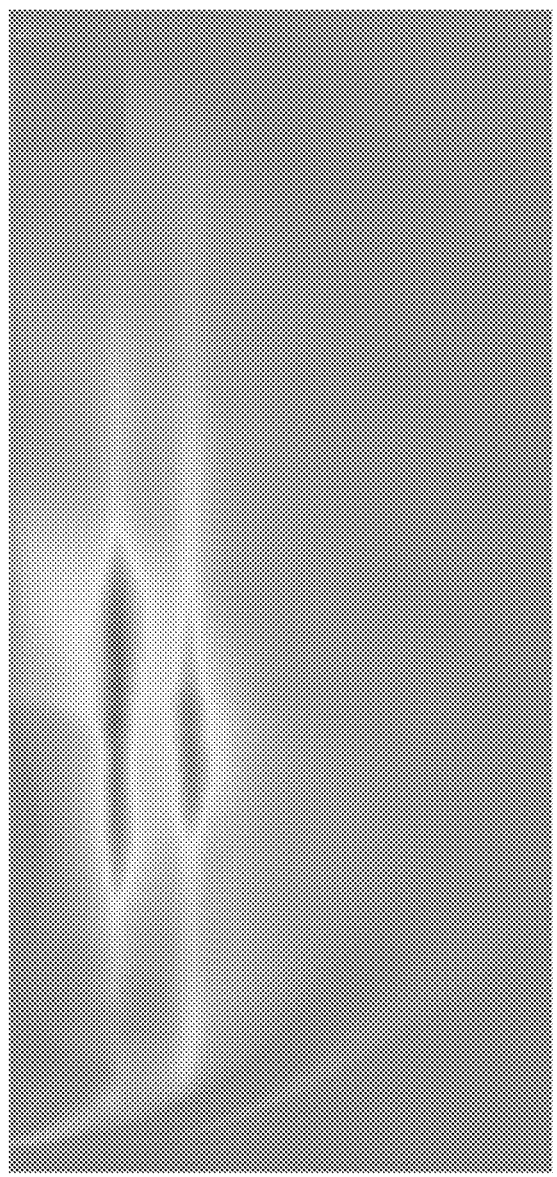

FIGS. 10A-10D show a sequence of images representing wave path tracking results of the seismic imaging system for shingle and tail seismic waves from FIG. 6, using the imaging condition of FIG. 8. The process 222 is applied to the shingle waves 278, 280, and 282 of FIG. 6. Besides the shingle waves, there are a lot of "tail waves" under wave 282, indicated by the area 284. The seismic imaging system 250 separates and windows out each shingle waves 278, 280, and 282 and the tail waves 284. The seismic imaging system 250 tracks the wave paths for these three shingle waves 278, 280, and 282 and the tail waves 284. FIG. 10A shows the wave path 350 of shingle wave 278. FIG. 10B shows the wave path 360 of shingle wave 280. FIG. 10C shows the wave path 370 of shingle wave 282. FIG. 10D shows the wave path 380 of tail waves 284.

The results 350 shown in FIG. 10A reveal that shingle wave 278 is diving, and reflected waves are propagating in the layer above the first low velocity notch 286a. The results 360 of FIG. 10B show that shingle wave 280 is diving and the reflected wave is propagating between the two low velocity notches 286a and 286b. The results 370 of FIG. 10C show that shingle wave 282 is diving below the second low velocity notch 286b. The results data 380 of FIG. 10D show that the tail waves 284 are guided waves propagated within the two notches 286a and 286b. The seismic imaging system 250 does not have data that identifies what the tail waves are before conducting the process 222.

Figure 11:
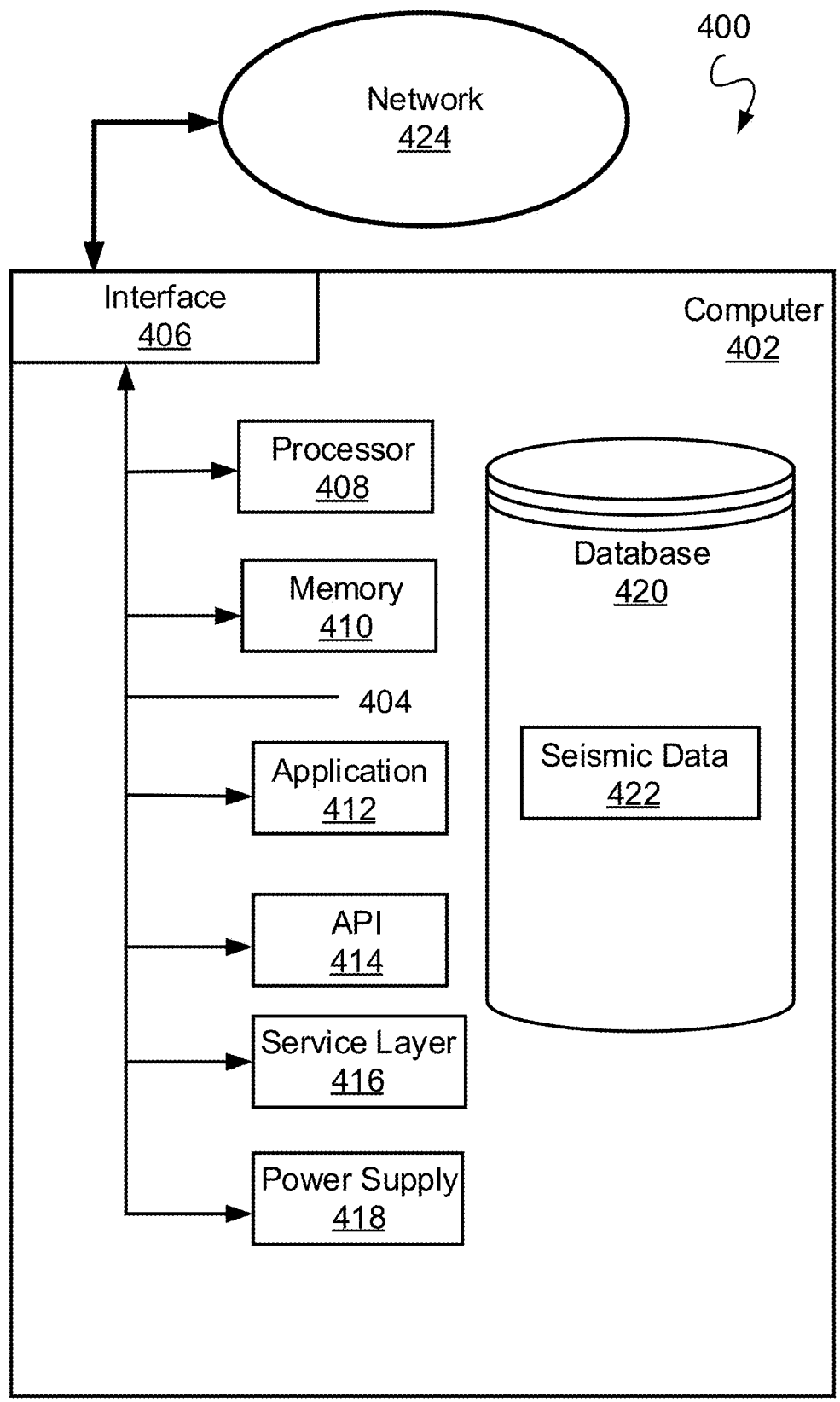
FIG. 11 is a diagram of an example computing system.

FIG. 11 is a block diagram of an example computing system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 424. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 424 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 404. In some implementations, any or all of the components of the computer 402, including hardware or software components, can interface with each other or the interface 406 (or a combination of both), over the system bus 404. Interfaces can use an application programming interface (API) 414, a service layer 416, or a combination of the API 414 and service layer 416. The API 414 can include specifications for routines, data structures, and object classes. The API 414 can be either computer-language independent or dependent. The API 414 can refer to a complete interface, a single function, or a set of APIs.

The service layer 416 can provide software services to the computer 402 and other components (whether illustrated or not) that are communicably coupled to the computer 402. The functionality of the computer 402 can be accessible for all service consumers using this service layer. Software services, such as those provided by the service layer 416, can provide reusable, defined functionalities through a defined interface. For example, the interface can be software written in JAVA, C++, or a language providing data in extensible markup language (XML) format. While illustrated as an integrated component of the computer 402, in alternative implementations, the API 414 or the service layer 416 can be stand-alone components in relation to other components of the computer 402 and other components communicably coupled to the computer 402. Moreover, any or all parts of the API 414 or the service layer 416 can be implemented as child or sub-modules of another software module, enterprise application, or hardware module without departing from the scope of the present disclosure.

The computer 402 includes an interface 406. Although illustrated as a single interface 406 in FIG. 11, two or more interfaces 406 can be used according to particular needs, desires, or particular implementations of the computer 402 and the described functionality. The interface 406 can be used by the computer 402 for communicating with other systems that are connected to the network 424 (whether illustrated or not) in a distributed environment. Generally, the interface 406 can include, or be implemented using, logic encoded in software or hardware (or a combination of software and hardware) operable to communicate with the network 424. More specifically, the interface 406 can include software supporting one or more communication protocols associated with communications. As such, the network 424 or the hardware of the interface can be operable to communicate physical signals within and outside of the illustrated computer 402.

The computer 402 includes a processor 408. Although illustrated as a single processor 408 in FIG. 11, two or more processors 408 can be used according to particular needs, desires, or particular implementations of the computer 402 and the described functionality. Generally, the processor 408 can execute instructions and can manipulate data to perform the operations of the computer 402, including operations using algorithms, methods, functions, processes, flows, and procedures as described in the present disclosure.

The computer 402 also includes a database 420 that can hold data (for example, seismic data 422) for the computer 402 and other components connected to the network 424 (whether illustrated or not). For example, database 420 can be an in-memory, conventional, or a database storing data consistent with the present disclosure. In some implementations, database 420 can be a combination of two or more different database types (for example, hybrid in-memory and conventional databases) according to particular needs, desires, or particular implementations of the computer 402 and the described functionality. Although illustrated as a single database 420 in FIG. 11, two or more databases (of the same, different, or combination of types) can be used according to particular needs, desires, or particular implementations of the computer 402 and the described functionality. While database 420 is illustrated as an internal component of the computer 402, in alternative implementations, database 420 can be external to the computer 402.

The computer 402 also includes a memory 410 that can hold data for the computer 402 or a combination of components connected to the network 424 (whether illustrated or not). Memory 410 can store any data consistent with the present disclosure. In some implementations, memory 410 can be a combination of two or more different types of memory (for example, a combination of semiconductor and magnetic storage) according to particular needs, desires, or particular implementations of the computer 402 and the described functionality. Although illustrated as a single memory 410 in FIG. 11, two or more memories 410 (of the same, different, or combination of types) can be used according to particular needs, desires, or particular implementations of the computer 402 and the described functionality. While memory 410 is illustrated as an internal component of the computer 402, in alternative implementations, memory 410 can be external to the computer 402.

The application 412 can be an algorithmic software engine providing functionality according to particular needs, desires, or particular implementations of the computer 402 and the described functionality. For example, application 412 can serve as one or more components, modules, or applications. Further, although illustrated as a single application 412, the application 412 can be implemented as multiple applications 412 on the computer 402. In addition, although illustrated as internal to the computer 402, in alternative implementations, the application 412 can be external to the computer 402.

The computer 402 can also include a power supply 418. The power supply 418 can include a rechargeable or nonrechargeable battery that can be configured to be either user- or non-user-replaceable. In some implementations, the power supply 418 can include power-conversion and management circuits, including recharging, standby, and power management functionalities. In some implementations, the power-supply 418 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 424. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A system for seismic imaging of a subterranean geological formation, the system comprising:
   at least one processor; and
   a memory storing instructions that, when executed by the at least one processor, cause the at least one processor to:
      generate a source wavefield from seismic data representing a subterranean formation;
      generate a receiver wavefield from the seismic data representing the subterranean formation;
      decompose the source wavefield to extract a source depth component;
      decompose the receiver wavefield to extract a receiver depth component;
      apply a transform to each of the source depth component and the receiver depth component;
      combine the source depth component and the receiver depth component to generate an imaging condition;
      extract a low-frequency term from the imaging condition to generate a wave-path tracking data;
      generate a wave-path from the wave-path tracking data;
      determine velocities of emitted seismic waves that form shingle waves and tail waves in a near surface region of the subterranean geological formation; and
      render, based on the determined velocities of the emitted seismic waves, a seismic image of at least a portion of the subterranean geological formation from the generated wave-path.

2. The system of claim 1, wherein the instructions are configured to cause the at least one processor to segment, into a time window, the receiver wavefield from a plurality of received wavefields.

3. The system of claim 1, wherein generating the seismic image based on the imaging condition reduces a computation cost by at least 50% relative to a computation cost of generating the seismic image independent from applying the imaging condition.

4. The system of claim 1, wherein decomposing each of the source wavefield and the receiver wavefield comprises a Hilbert transform with respect to an axis orthogonal to a surface of the subterranean geological formation.

5. The system of claim 1, wherein an up-going component of each of the source wavefield and the receiver wavefield is oriented toward a surface of the subterranean geological formation, and wherein a down-going component of each of the source wavefield and the receiver wavefield is oriented away from the surface of the subterranean geological formation.

6. The system of claim 1, wherein the instructions are configured to cause the at least one processor to render the seismic image for presentation on a user interface.

7. A method for seismic imaging of a subterranean geological formation, the method comprising:
   generating a source wavefield from seismic data representing a subterranean formation;
   generating a receiver wavefield from the seismic data representing the subterranean formation;
   decomposing the source wavefield to extract a source depth component;
   decomposing the receiver wavefield to extract a receiver depth component;
   applying a transform to each of the source depth component and the receiver depth component;
   combining the source depth component and the receiver depth component to generate an imaging condition;
   extracting a low-frequency term from the imaging condition to generate a wave-path tracking data;
   generating a wave-path from the wave-path tracking data;
   determining velocities of emitted seismic waves that form shingle waves and tail waves in a near surface region of the subterranean geological formation; and
   rendering, based on the determined velocities of the emitted seismic waves, a seismic image of at least a portion of the subterranean geological formation from the generated wave-path.

8. The method of claim 7, further comprising segmenting, into a time window, the receiver wavefield from a plurality of received wavefields.

9. The method of claim 7, wherein generating the seismic image using the imaging condition reduces a computation cost by at least 50% relative to a computation cost of generating the seismic image independent from applying the imaging condition.

10. The method of claim 7, further comprising decomposing each of the source wavefield and the receiver wavefield by performing a Hilbert transform with respect to an axis orthogonal to a surface of the subterranean geological formation.

11. The method of claim 7, wherein an up-going component of each of the source wavefield and the receiver wavefield is oriented toward a surface of the subterranean geological formation, and wherein a down-going component of each of the source wavefield and the receiver wavefield is oriented away from the surface of the subterranean geological formation.

12. The method of claim 7, further comprising rendering the seismic image for presentation on a user interface.

13. One or more non-transitory computer readable media storing instructions that are executable by one or more processors configured to perform operations comprising:
   generating a source wavefield from seismic data representing a subterranean formation;
   generating a receiver wavefield from the seismic data representing the subterranean formation;
   decomposing the source wavefield to extract a source depth component;
   decomposing the receiver wavefield to extract a receiver depth component;
   applying a transform to each of the source depth component and the receiver depth component;
   combining the source depth component and the receiver depth component to generate an imaging condition;

extracting a low-frequency term from the imaging condition to generate a wave-path tracking data;

generating a wave-path from the wave-path tracking data;

determining velocities of emitted seismic waves that form shingle waves and tail waves in a near surface region of the subterranean geological formation; and rendering, based on the determined velocities of the emitted seismic waves, a seismic image of at least a portion of the subterranean geological formation from the generated wave-path.

14. The one or more non-transitory computer readable media of claim 13, the operations further comprising segmenting, into a time window, the receiver wavefield from a plurality of received wavefields.

15. The one or more non-transitory computer readable media of claim 13, wherein generating the seismic image using the imaging condition reduces a computation cost by at least 50% relative to a computation cost of generating the seismic image independent from applying the imaging condition.

16. The one or more non-transitory computer readable media of claim 13, the operations further comprising decomposing each of the source wavefield and the receiver wavefield by performing a Hilbert transform with respect to an axis orthogonal to a surface of the subterranean geological formation.

17. The one or more non-transitory computer readable media of claim 13, wherein an up-going component of each of the source wavefield and the receiver wavefield is oriented toward a surface of the subterranean geological formation, and wherein a down-going component of each of the source wavefield and the receiver wavefield is oriented away from the surface of the subterranean geological formation.

* * * * *